US009565201B2

(12) United States Patent
Compagna et al.

(10) Patent No.: US 9,565,201 B2
(45) Date of Patent: Feb. 7, 2017

(54) SECURITY THREAT IDENTIFICATION/TESTING USING ANNOTATED SEQUENCE DIAGRAMS

(71) Applicants: Luca Compagna, La Roquette sur Siagne (FR); Serena Ponta, Antibes (FR)

(72) Inventors: Luca Compagna, La Roquette sur Siagne (FR); Serena Ponta, Antibes (FR)

(73) Assignee: SAP SE, Walldorf (DE)

( * ) Notice: Subject to any disclaimer, the term of this patent is extended or adjusted under 35 U.S.C. 154(b) by 27 days.

(21) Appl. No.: 14/667,363

(22) Filed: Mar. 24, 2015

(65) Prior Publication Data

US 2016/0285902 A1 Sep. 29, 2016

(51) Int. Cl.
*H04L 29/06* (2006.01)
*G06F 21/57* (2013.01)

(52) U.S. Cl.
CPC ......... *H04L 63/1425* (2013.01); *G06F 21/577* (2013.01); *H04L 63/1433* (2013.01)

(58) Field of Classification Search
CPC ............. H04L 63/1425; H04L 63/1475; H04L 63/1433; G06Q 10/06; G06F 11/3664; G06F 21/56
See application file for complete search history.

(56) References Cited

U.S. PATENT DOCUMENTS 6,820,044 B2 * 11/2004 Groen ................ G06Q 10/0635 703/2
8,438,533 B2 * 5/2013 Fritzsche .................. G06F 8/10 717/104

(Continued)

OTHER PUBLICATIONS

Vittorio Cortellessa, Harshinder Singh, Bojan Cukic : Early reliability assessment of UML based software models, WOSP, 2002 ACM, Jul. 24-26, Rome, Italy, pp. 302-309.*

(Continued)

*Primary Examiner* — Catherine Thiaw
(74) *Attorney, Agent, or Firm* — Fountainhead Law Group P.C.

(57) ABSTRACT

Embodiments provide apparatuses and methods supporting software development teams in identifying potential security threats, and then testing those threats against under-development scenarios. At design-time, embodiments identify potential threats by providing sequence diagrams enriched with security annotations. Security information captured by the annotations can relate to topics such as security goals, properties of communications channels, environmental parameters, and/or WHAT-IF conditions. The annotated sequence diagram can reference an extensible catalog of functions useful for defining message content. Once generated, the annotated sequence diagram can in turn serve as a basis for translation into a formal model of system security. At run-time, embodiments support development teams in testing, by exploiting identified threats to automatically generate and execute test-cases against the up and running scenario. The security annotations may facilitate detection of subtle flaws in security logic, e.g., those giving rise to Man-in-the-middle, authentication, and/or confidentiality issues in software under-development.

10 Claims, 31 Drawing Sheets

(56) References Cited

U.S. PATENT DOCUMENTS

| | | | | |
|---|---|---|---|---|
| 2007/0150322 | A1* | 6/2007 | Falchuk | G06Q 10/0633 709/200 |
| 2009/0037884 | A1* | 2/2009 | Benameur | G06F 11/3608 717/126 |
| 2009/0099882 | A1* | 4/2009 | Karabulut | G06Q 10/06 713/152 |
| 2012/0151455 | A1* | 6/2012 | Tsantilis | G06F 11/3688 717/132 |
| 2014/0289797 | A1* | 9/2014 | Trani | H04L 63/08 726/3 |
| 2015/0033346 | A1* | 1/2015 | Hebert | G06F 21/577 726/25 |
| 2015/0074081 | A1* | 3/2015 | Falter | G06F 17/30404 707/713 |

OTHER PUBLICATIONS

A. Armando, R. Carbone, L. Compagna, J. Cuéllar, G. Pellegrino, and A. Sorniotti. An authentication flaw in browser-based single sign-on protocols: Impact and remediations. Computers & Security, 33:41-58, 2013.

Alessandro Armando, Giancarlo Pellegrino, Roberto Carbone, Alessio Merlo, and Davide Balzarotti. From model-checking to automated testing of security protocols: Bridging the gap. In Achim D. Brucker and Jacques Julliand, editors, TAP, vol. 7305 of LNCS. Springer, 2012.

Article entitled "AVANTSSAR: Automated VAlidatioN of Trust and Security of Service-oriented, ARchitectures," retrieved from www.avantssar.eu, Deliverable version: v2.0, Date of Delivery: Mar. 2011.

SAP SE Article "simplify Complex Architectures and See the Potential Impact of New Technologioes," Rev. Jul. 2014.

Essen; Mathias et al, "OAuth 2.0—Constrained Authorization and Single Sign-On for OData Services—Security", Mar. 27, 2014, 4 pages.

Vigano; Luca, "Deliverable D4.2 SPaCloS Tool v.1 and Validation Methodology Patterns (final version)", Oct. 1, 2010, 55 pages.

* cited by examiner

IUT Definition: foodiXfeide

Mapping
Bindings between ASLan elements and Java objects

[Add free mapping]

| ASLan element | Mapping type | Value |
|---|---|---|
| i | String | intruder |
| idp | String | https://openidp.feide.no/simplesaml/saml2/ |
| nif_hbody | Wild Card (any value) | |
| nif_req_header | Wild Card (any value) | |
| nif_rez_header | Wild Card (any value) | |
| post | String | post |
| resourceurl | URL | https://foodi.org/profile?idp=https%3A//op: |
| resourceurlI | URL | http://localhost:8081/resource |
| sp | URL | https://foodi.org/simplesaml/module.php/sa |
| userlogin | String | saml_sso.missingsteps.FoodiXfeideAuth |
| resource_uri | Adapter Class | eu.ek.sfate.adapters.core.resource.URI |

▼ Model elements
List of mappable elements in sso_test.aslan

| Elements | Type |
|---|---|
| c | agent |
| ch_c2i_s2 | channel |
| ch_c2idp_s1 | channel |
| ch_c2idp_s2 | channel |
| ch_c2sp_s1 | channel |
| ch_i2c_s2 | channel |
| ch_idp2c_s1 | channel |
| ch_idp2c_s2 | channel |
| ch_sp2c_s1 | channel |
| code_200 | code |
| code_30x | code |

▼ SUT
List of agents being under test

Agents under test
idp
sp

FIG. 3C

```
<stiate_msg_annotation>
        <message>
                <message_name>httpResponse</message_name>
                <message_arguments>
                        <arg opt="False" fresh="False" learn="False" ... id="..">
                                <arg_name type="code">code_200</arg_name>
                        </arg>
                        <arg opt="False" fresh="False" learn="False" ... id="..">
                                <arg_name type="res_header">nil</arg_name>
                        </arg>
                        <arg opt="False" fresh="False" learn="False" ... id="..">
                                <arg_name type="hbody">postRedirectForm</arg_name>
                                <sub_message_arguments>
[...]
                </message_arguments>
                <pre_actions>
                </pre_actions>
                <post_actions>
                </post_actions>
        </message>
        <channel>
                <property>bilateral</property>
        </channel>
</stiate_msg_annotation>
```

FIG. 9

```
<stiate_entity_annotation>
        <identifier>C</identifier>
        <roles>
                <role type="trusted">False</role>
        </roles>
        <objects>
                <object type="learn" name="Data" position="6" />
                <object type="known" name="SP" position="0" />
                <object type="known" name="IdP" position="0" />
                <object type="known" name="ResourceURL" position="1" />
                <object type="known" name="C" position="0" />
        </objects>
</stiate_entity_annotation>
```

FIG. 11

```
<stiate_environment_annotation>
        <session>
            <goals>
                <goal type="authenticates_on">
                    <entities>
                        <identifier>C</identifier>
                        <identifier>SP</identifier>
                    </entities>
                    <object>ResourceURL</object>
                </goal>
            </goals>
        </session>
        <scenarios>
            <scenario name="Scenario 1">
                <sessions>
                    <session name="C=c, SP=sp, IdP=idp">
                    <variables>
                        <variable name="ResourceURL"
value="resourceurl" isInvar="False" isUnique="True"/>
                    </variables>
                    </session>
                    <session name="C=c, SP=i, IdP=idp">
                    <variables>
                        <variable name="ResourceURL"
value="resourceurl1" isInvar="False" isUnique="True"/>
                    </variables>
                    </session>
                </sessions>
            </scenario>
        </scenarios>
        <tables>
        </tables>
        <catalog>
        [...]
        </catalog>
</stiate_environment_annotation>
```

FIG. 16

```
Loop through the argument options:
   Set the options' values
   Set the messages' objects according to options' values
   Loop through the channels' properties:
      Set the channels' properties
      Loop through the scenarios
         Set the value of the scenarios' session
         Set the ASLan++ filename
         Generate the ASLan++ file
      end Loop
   end Loop
end Loop
```

FIG. 18 samlsso_o1_ch12_sc1.aslan++

```
        ch_c2i_s2: channel;
        ch_idp2c_s2: channel;
        resourceurl1: uri_element;

    entity Session(Ch_SP2C: channel, Ch_C2IdP: channel, Ch_C2SP: channel, Ch_IdP2C: channel, C: agent, SP:

        entity C(Actor: agent, SP: agent, IdP: agent, Ch_C2SP: channel, Ch_SP2C: channel, Ch_C2IdP: channel

          symbols
            SP_2_1_0_1_0_0: agent;
            IdP_2_1_0_1_0_1: agent;
            ID_2_1_0_1_0_2: id;
            ResourceURL_2_1_0_1_1_0: uri_element;
            IdP_4_2_1_0_1: agent;
            C_4_2_1_0_2: agent;
            ID_4_2_1_0_3: id;
            ResourceURL_4_2_1_1_0: uri_element;
            Data: data;

          body
          {
            Actor -Ch_C2SP-> SP : httpRequest(get,
                                              resource_uri(SP_authn_C_on_ResourceURL:(ResourceURL)),
                                              nil_req_header,
                                              nil_hbody);
            SP -Ch_SP2C-> Actor : httpResponse(code_30x,
                                              location(uri_host_qs(host_agent(IdP),httpBinding(authnReq
                                              nil_hbody);
            Actor -Ch_C2IdP-> IdP : httpRequest(get,
                                                uri_host_qs(host_agent(IdP),httpBinding(authnRequest(SP
```

FIG. 19B

```
public static Object constr_httpRequest(Object method, Object url,
        Object header, Object body) {
    String httpmethod = (String) method;
    UrlEncodedFormEntity uriencoded = null;
    Logger.info("===============HTTP REQUEST===============");
    Logger.info("method=" + method);
    Logger.info("destination=" + url);
    Logger.info("header=" + header);
    Logger.info("body=" + body);
    Logger.info("============================================");
    URI uri = URI.create((String) url);
    HttpRequestBase req = null;
    if (body instanceof UrlEncodedFormEntity) {
        UrlEncodedFormEntity bodyex = (UrlEncodedFormEntity) body;
        req = HTTPUtils.httpMethodFactory(httpmethod, uri,bodyex);
    }else req = HTTPUtils.httpMethodFactory(httpmethod, uri,uriencoded);
    if (header instanceof Header[]) {

        req.setHeaders((Header[]) header);

    }
    return req;
}
```

FIG. 20

```
public static Object pi1_httpRequest(Object arg1) {
    HttpRequestBase hReq = (HttpRequestBase) arg1;
    return hReq.getMethod();
}

public static Object pi2_httpRequest(Object arg1) {
    HttpRequestBase hReq = (HttpRequestBase) arg1;
    String dom_port = hReq.getURI().getScheme() + "://"
            + hReq.getURI().getHost();
    if (hReq.getURI().getPort() >= 0)
        dom_port += ":" + hReq.getURI().getPort();
    dom_port += "/" + hReq.getURI().getPath();
    return dom_port;
}

public static Object pi3_httpRequest(Object arg1) {
    Header headers[] = ((HttpRequestBase) arg1).getAllHeaders();
    for (Header h : headers) {
        System.out.println(h.getName() + ": " + h.getValue());
    }
    return headers;
}

public static Object pi4_httpRequest(Object arg1) {
```

FIG. 21

SECURITY THREAT IDENTIFICATION/TESTING USING ANNOTATED SEQUENCE DIAGRAMS

BACKGROUND

Unless otherwise indicated herein, the approaches described in this section are not prior art to the claims in this application and are not admitted to be prior art by inclusion in this section.

Embodiments relate to computer security, and in particular, to identifying and testing security threats using annotated sequence diagrams.

Business scenarios are evolving to become more complex and collaborative. In particular, consumers may use multiple devices to access remote business applications whose delivered resources are often the results of intricate business logic executed among multiple organizations and service providers.

Such business applications may cross trusted domains, making use of multiple heterogeneous devices and services. This in turn can create security issues, with a need to focus not only on isolated systems but also the overall scenario including the interplay between entities/devices/services present within a larger landscape.

SUMMARY

Embodiments provide apparatuses and methods supporting software development teams in identifying potential security threats, and then testing those threats against under-development scenarios. At design-time, embodiments identify potential threats by providing sequence diagrams enriched with security annotations. Security information captured by the annotations can relate to topics such as security goals, properties of communications channels, environmental parameters, and/or WHAT-IF conditions. The annotated sequence diagram can reference an extensible catalog of functions useful for defining message content. Once generated, the annotated sequence diagram can in turn serve as a basis for translation into a formal model of system security. At run-time, embodiments support development teams in testing, by exploiting identified threats to automatically generate and execute test-cases against the up and running scenario. The security annotations may facilitate detection of subtle flaws in security logic, e.g., those giving rise to Man-in-the-middle, authentication, and/or confidentiality issues in software under-development.

An embodiment of a computer-implemented method comprises an engine receiving a sequence diagram of a system comprising a plurality of entities, and messages between the plurality of entities sent along communications channels. The engine generates from the sequence diagram, an annotated sequence diagram including an annotation of security information. The engine displays the annotated sequence diagram.

A non-transitory computer readable storage medium embodies a computer program for performing a method comprising an engine receiving a sequence diagram of a system comprising a plurality of entities, and messages between the plurality of entities sent along communications channels. The engine generates from the sequence diagram, an annotated sequence diagram including an annotation of security information reflecting an environment in which the plurality of entities reside. The engine displays the annotated sequence diagram. The engine translates the annotated sequence diagram into a model based upon the annotation.

An embodiment of a computer system comprises one or more processors and a software program executable on said computer system. The software program configured to cause an engine to receive a sequence diagram of a system comprising a plurality of entities, and messages between the plurality of entities sent along communications channels. The engine is configured to generate from the sequence diagram, an annotated sequence diagram including an annotation of security information reflecting an environment in which the plurality of entities reside, the annotation comprising a WHAT-IF condition, a security goal, or a communication channel property. The engine is configured to display the annotated sequence diagram. The engine is configured to translate the annotated sequence diagram into a model based upon the annotation.

In certain embodiments the security information reflects an environment in which the plurality of entities reside.

In some embodiments the annotation comprises a WHAT-IF condition, a security goal, or a communication channel property.

According to particular embodiments the annotation comprises a function.

In various embodiments the function references a catalog.

Certain embodiments further comprise the engine translating the annotated sequence diagram into a model based upon the annotation.

Some embodiments further comprise the engine identifying a threat based upon the model.

Various embodiments further comprise the engine displaying a rendering of the threat.

Particular embodiments further comprise the engine testing the threat.

The following detailed description and accompanying drawings provide a better understanding of the nature and advantages of embodiments.

BRIEF DESCRIPTION OF THE DRAWINGS

FIG. 9 shows XML encoding of message security annotation.

FIG. 11 shows XML encoding of entity security annotation.

FIG. 16 shows XML encoding of environment security annotation.

FIG. 18 shows an algorithm generating multiple ASLan++ files.

FIG. 20 shows a testing adapter with Java constructor for HTTP request.

FIG. 21 shows a testing adapter with Java de-constructors for HTTP request.

DETAILED DESCRIPTION

Described herein are systems and methods for automatic security threat identification and testing according to various embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Figure 1:
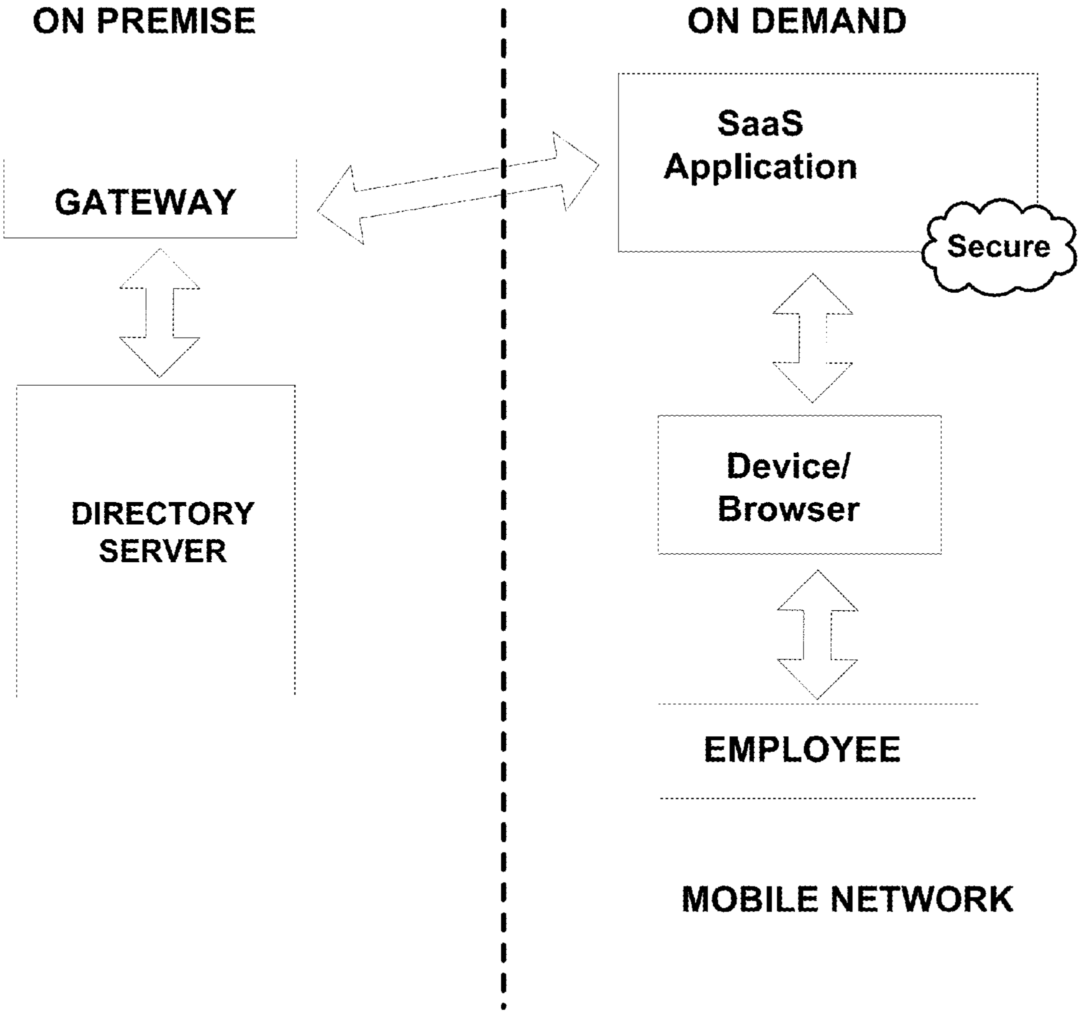
FIG. 1 shows a simplified view of a nowadays business scenario.

FIG. 1 presents a simplified example of a typical business scenario. Here, an employee uses a client (e.g., mobile native application, browser) to access an on-demand application. That on-demand application in turn needs employee data stored on a different on-premise system in order to collaborate as well as to serve the employee request.

In allowing this business scenario, the development team responsible for the on-premise system carefully considers threats emerging from the overall interaction. For instance, these developers will consider the fact that potentially sensitive corporate data will flow to the on-demand application.

Though this access is granted on behalf of the employee, it may be important to ensure that proper security measures and policies are in place and enforced to prevent unauthorized entities from gaining access to that corporate data. This in turn raises the following issues.

WHAT-IF there is a weakness in one of the third parties' provided components?

What are implications on the security of the components implemented in-house by the development team?

This amounts, among other things, to thorough scrutiny of the overall information flow and the security protocols in place, by considering worst-case scenarios and WHAT-IF conditions.

Threat modeling is a structured approach to security that allows for identifying, prioritizing, and mitigating highest-priority threats posing a greatest early potential to impact to an application first. Drawing an architecture diagram is common practice during threat modeling, as it allows for brainstorming in a structured manner on potential threats.

However, such an architecture diagram captures only a static view of the business application. Thus, subtle security logic flaws—whose root causes lie in the interaction between the various entities and underlying protocols—can go undetected.

Formal methods for security threat identification and testing have been proposed. However an obstacle to adopting such methods lies in the provisioning of the formal models needed to trigger the techniques.

In fact, identifying threats via formal analysis commences with specifying a formal model capturing the application scenario. Variants of this formal model can then be derived so to model any relevant combination of the WHAT-IF conditions, etc.

Two main issues may emerge. One is that development teams are not accustomed to writing formal models, and this activity would add to cost. Another is that writing and managing inter-related formal models can be complex and tedious. Both these issues negatively impact the cost/benefit ratio of a potential usage of formal methods in this context.

Embodiments provide apparatuses and methods supporting software development teams in identifying potential security threats, and then testing those threats against under-development scenarios. At design-time, embodiments identify potential threats by providing sequence diagrams enriched with security annotations. Security information captured by the annotations can relate to topics such as security goals, properties of communications channels, environmental parameters, and/or WHAT-IF conditions. The annotated sequence diagram can reference an extensible catalog of functions useful for defining message content. Once generated, the annotated sequence diagram can in turn serve as a basis for translation into a formal model of system security. At run-time, embodiments support development teams in testing, by exploiting identified threats to automatically generate and execute test-cases against the up and running scenario. The security annotations may facilitate detection of subtle flaws in security logic, e.g., those giving rise to Man-in-the-middle, authentication, and/or confidentiality issues in software under-development.

Figure 22:
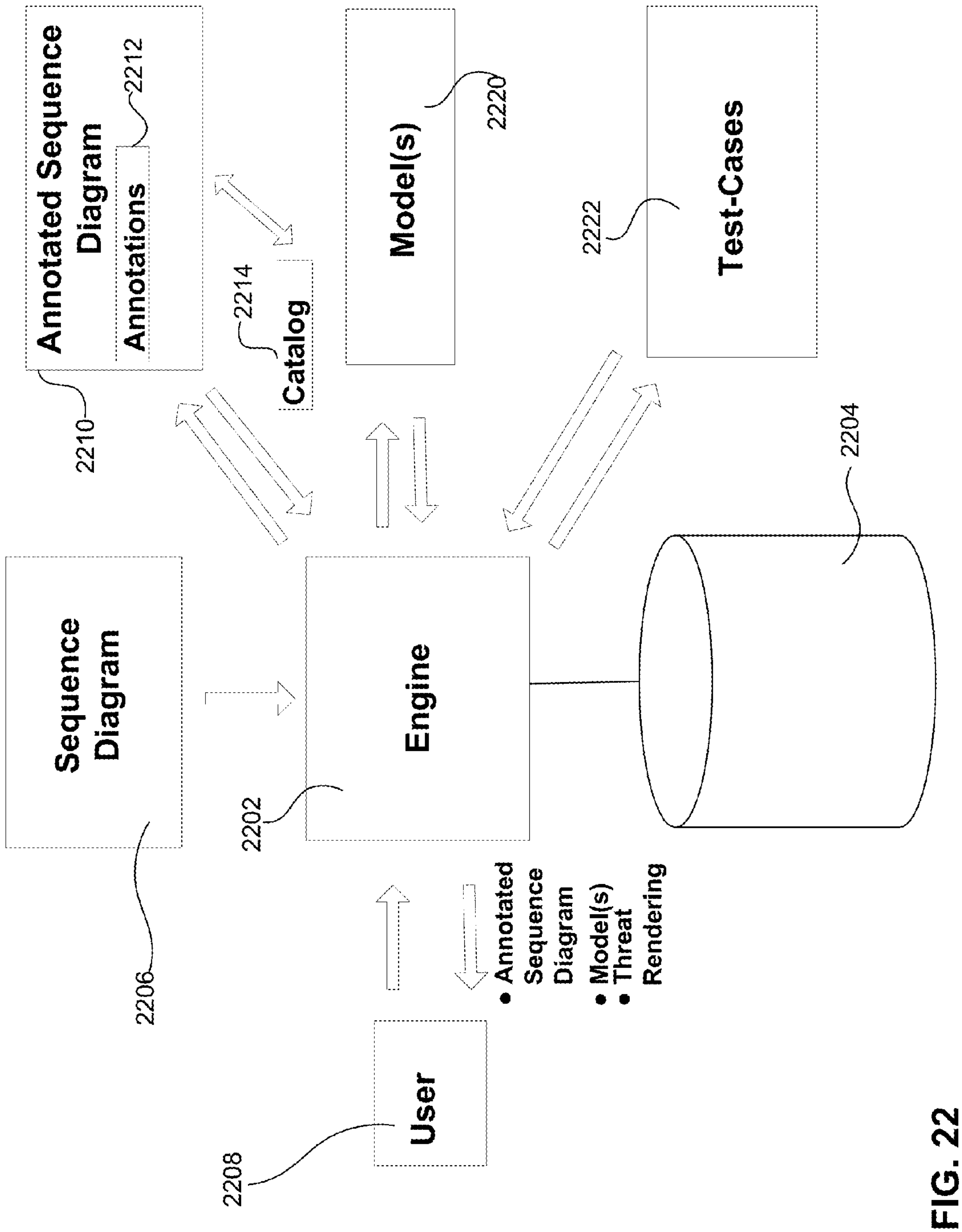
FIG. 22 is a simplified view of an embodiment of a security threat identification system according to an embodiment.

FIG. 22 shows a simplified view of a system 2200 for security threat identification and/or testing according to an embodiment. In particular, the system comprises a security engine 2202 that is in communication with an underlying database 2204. The database may be configured to store as complex data objects, information (including security information) relating to a communications system whose security is being evaluated.

The security engine is configured to receive as input, a sequence diagram 2206. This sequence diagram illustrates various parties to a secure transaction, as well as the various communication channels and messages passed between them as part of that transaction. Examples of sequence diagrams are shown and described further below in connection with FIGS. 2 and 3A.

Based upon the sequence diagram, and further input from the user 2208, the security engine is configured to generate an annotated sequence diagram 2210. Examples of input from the user may be specific security information such as WHAT-IF scenarios, security goals to be achieved, and properties of the various communications channels through which messages are being transmitted. These are discussed in detail below.

Figure 26:
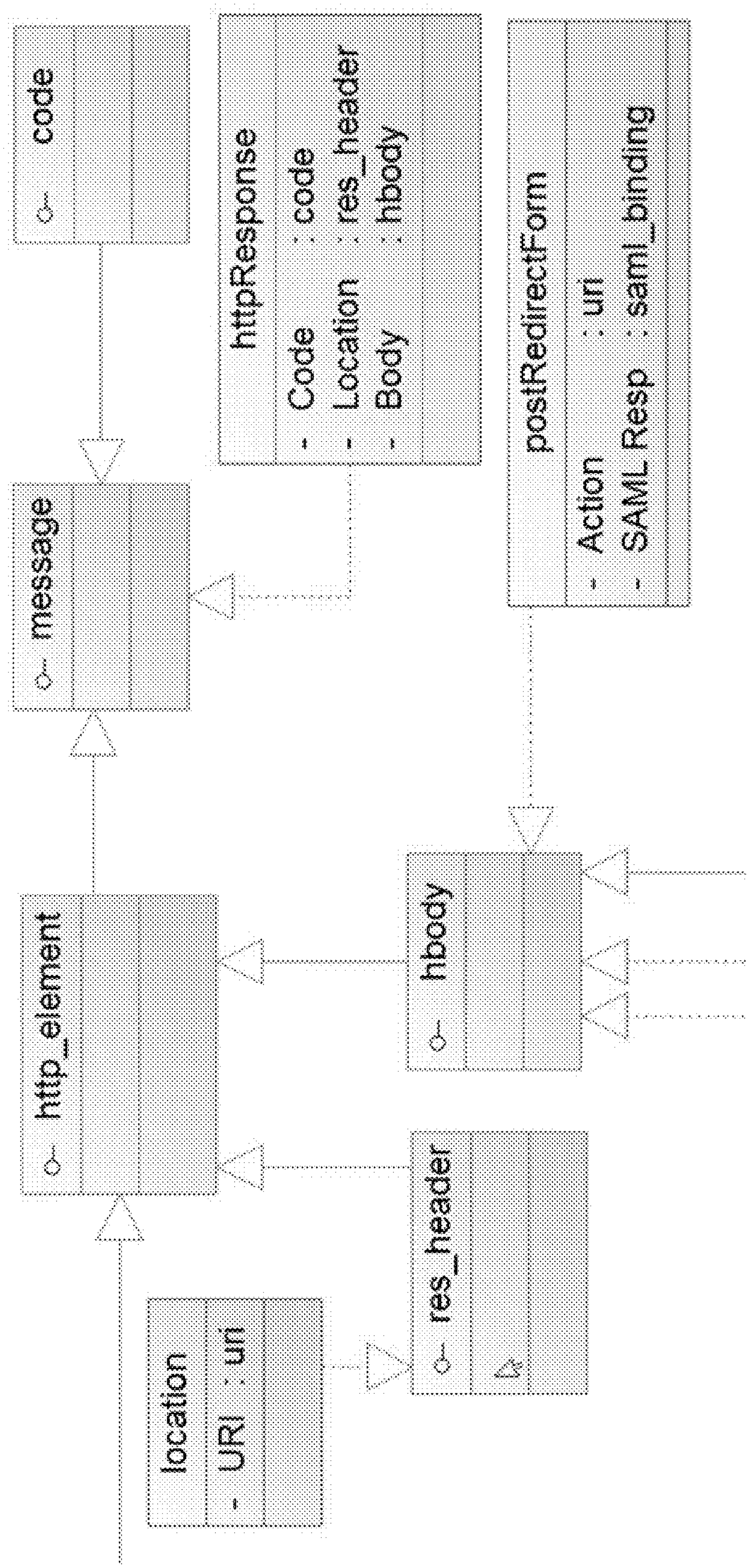
FIG. 26 shows a catalog excerpt.

The security engine processes the user inputs to create the annotated sequence diagram including annotations 2212 relating to security information. The annotations may include functions used for defining message content, that reference an extensible catalog 2214. FIG. 26 described in detail later below, provides an excerpt of such a catalog represented as a class diagram.

FIG. 22 goes on to show the engine processing the annotated sequence diagram for translation into a formal model 2220. One example of such a model is an ASLan++ formal specification. Details regarding the generation of the formal model from the annotated sequence diagram are provided later below.

Finally, FIG. 22 shows the application of test cases 2222 for purposes of identifying security threats, and then evaluating the security of the actual system in view of those threats. The test cases are generated out of the abstract test cases, which are the result of the analysis done by the model checker having the formal model in input.

Figure 23:
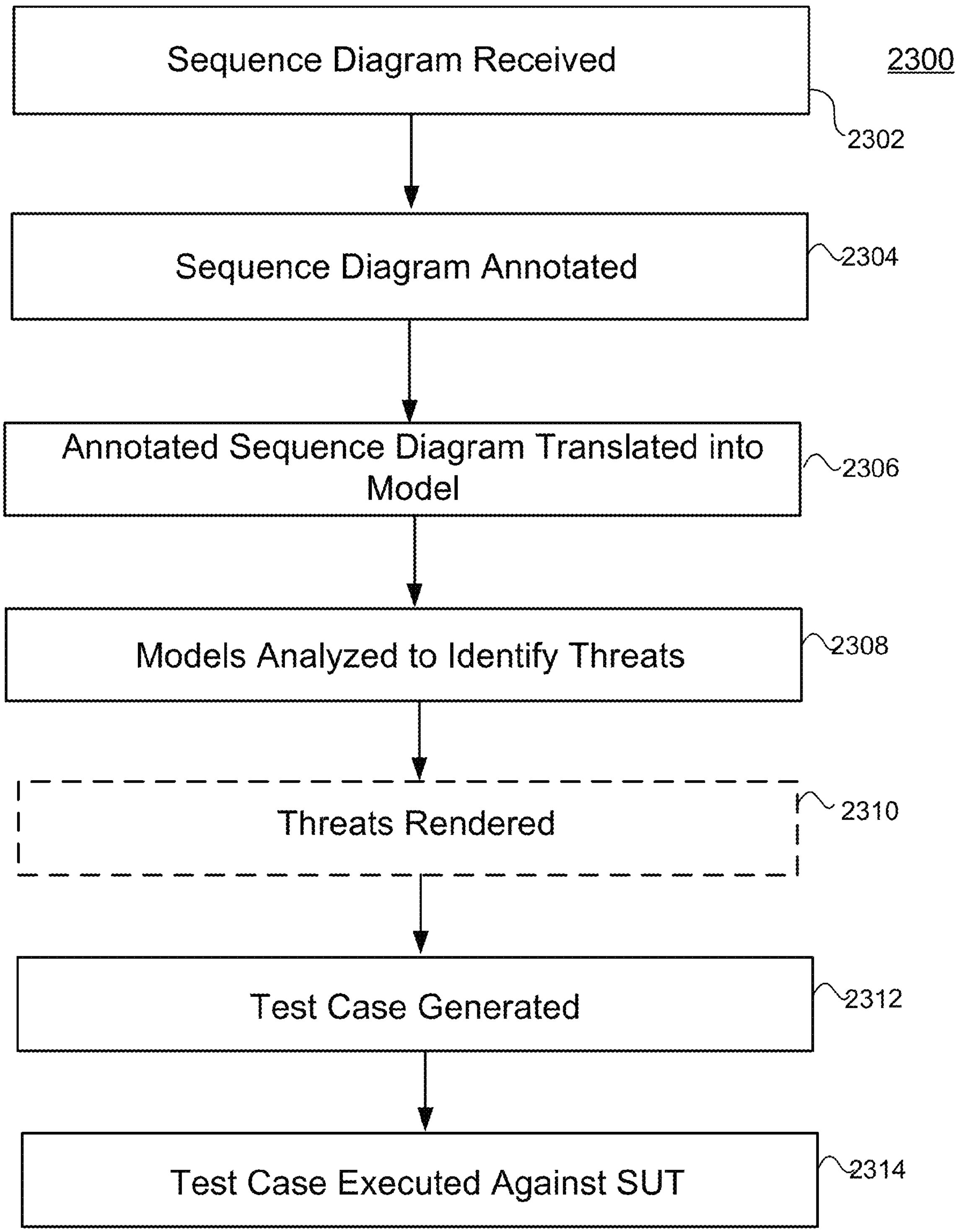
FIG. 23 is a simplified flow diagram of a process according to an embodiment.

FIG. 23 is a simplified flow diagram showing a method 2300 of security threat identification and/or testing according to an embodiment. In a first step 2302, a sequence diagram is received.

In a second step 2304, the sequence diagram is enriched with annotations relating to security information. In a third step 2306, the enriched, annotated sequence diagram is translated into a formal model.

In a fourth step 2308, the formal model is analyzed to identify a threat. In an optional fifth step 2310, identified threats may be rendered for the user.

In a sixth step 2312, a test case is generated. In a seventh step 2314, the test case is executed against the System Under Test (SUT) to determine its security.

Further details regarding approaches to security threat identification and testing according to embodiments, is now provided in the following overview, and followed by a specific example.

Embodiments propose Security Threat Identification and TEsting (STIATE) via sequence diagrams augmented with security annotations. This supports development teams toward security threat identification and testing of scenarios under-development, allowing recognition and testing of subtle security logic flaws that may go unnoticed utilizing conventional static architecture diagrams and other methodologies.

Figure 2:
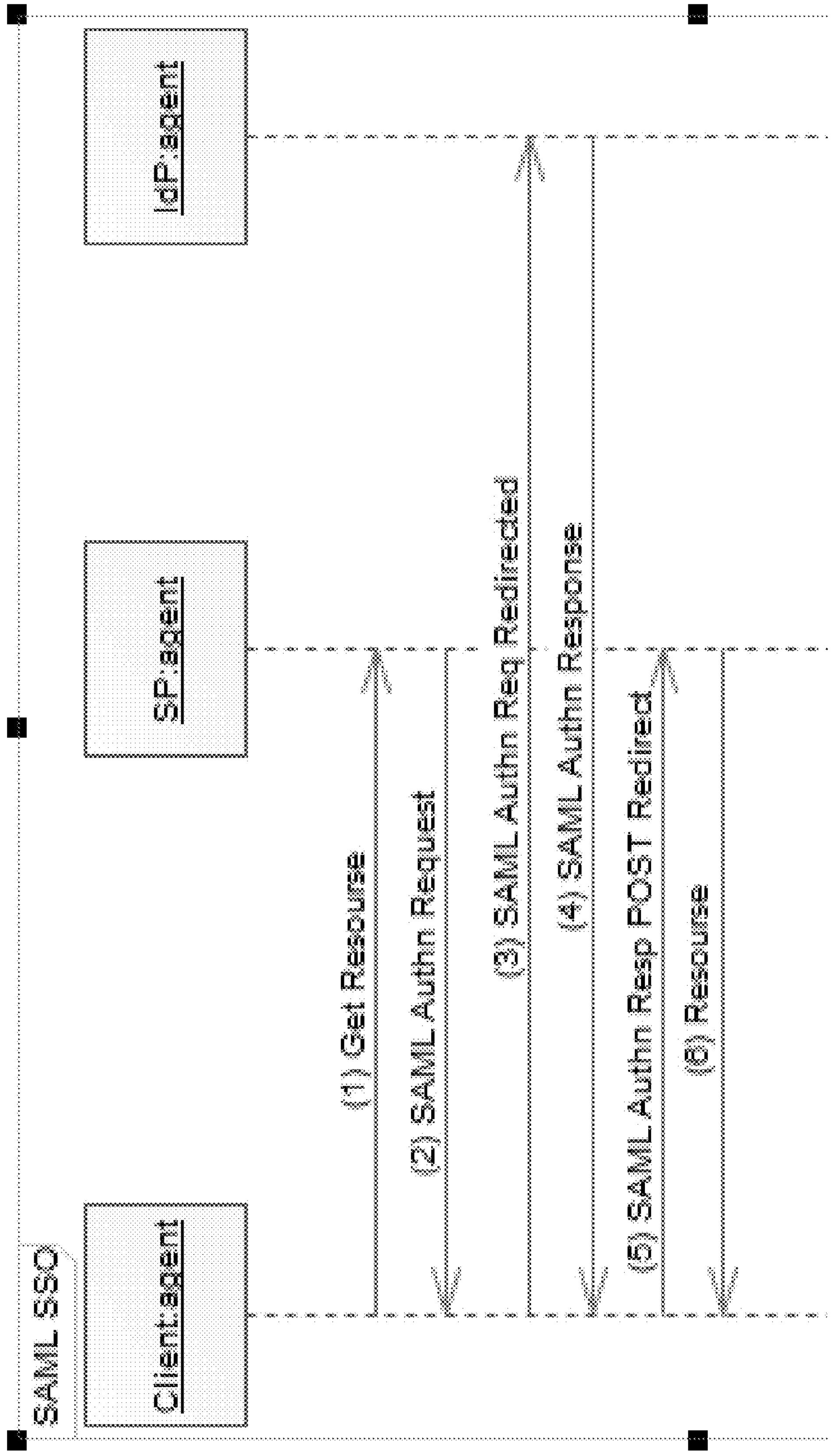
FIG. 2 is an example of Sequence Diagram.

FIG. 2 shows a Sequence Diagram (SD) representing the SAML2 SSO protocol. This is an established security standard protocol used by modern, multi-party scenarios like the one shown in FIG. 1.

FIG. 2 shows a sequence diagram. Three (3) entities, i.e., Client (C), Service Provider (SP), and Identity Provider (IdP) represent the actors playing the protocol.

Six (6) messages represent interactions amongst the entities. When requesting a resource from a SP, C would get an assertion from the IdP. C can spend this assertion with the SP in order to be granted access to the resource.

Embodiments are directed to identifying and/or testing threats for the type of Sequence Diagram of FIG. 2. In particular, FIG. 3 shows an overview of a STIATE system according to an embodiment.

Figure 3:
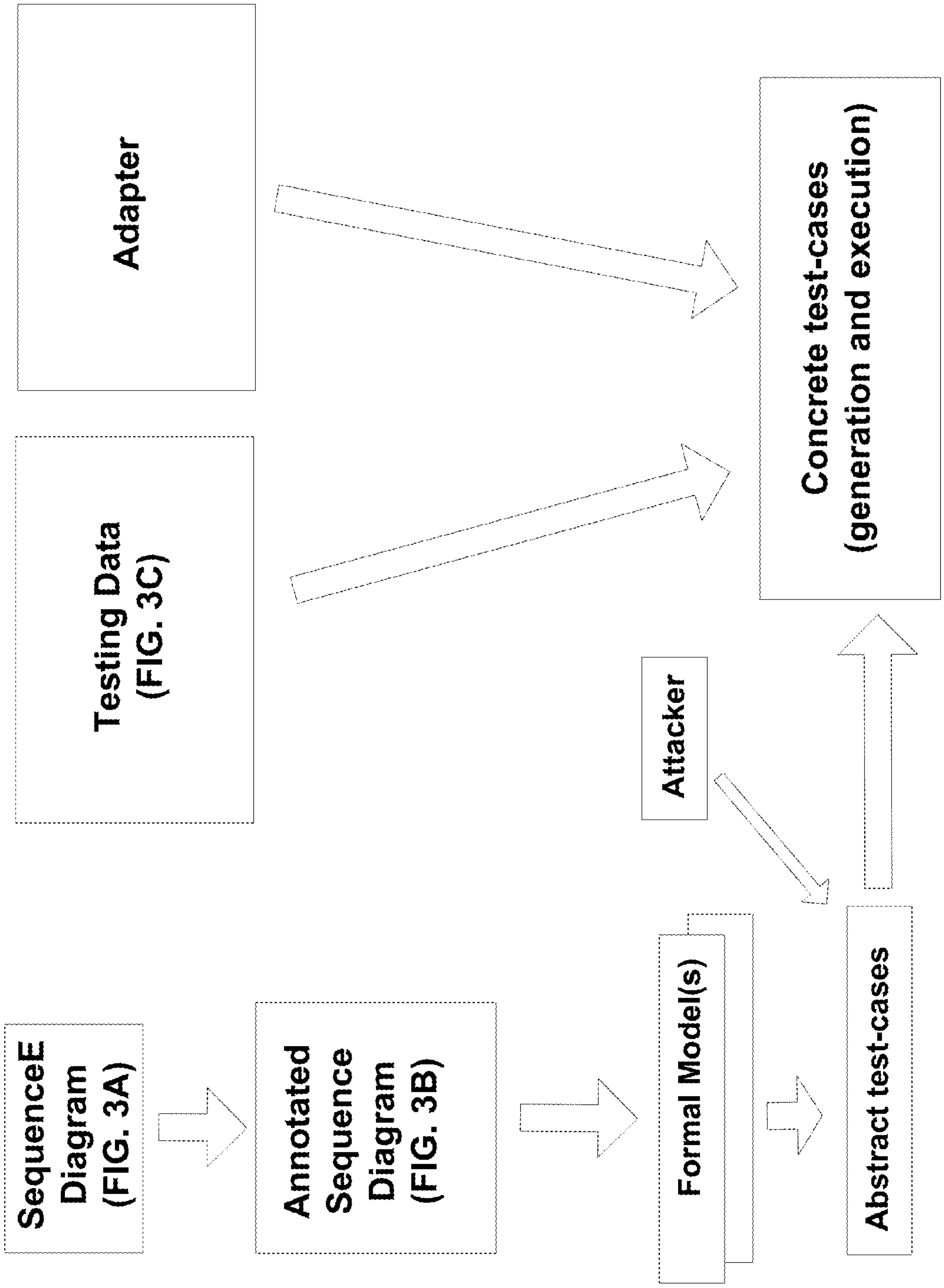
FIGS. 3-3C show an outline of a security threat identification and testing system according to an embodiment.
Figure 3A:
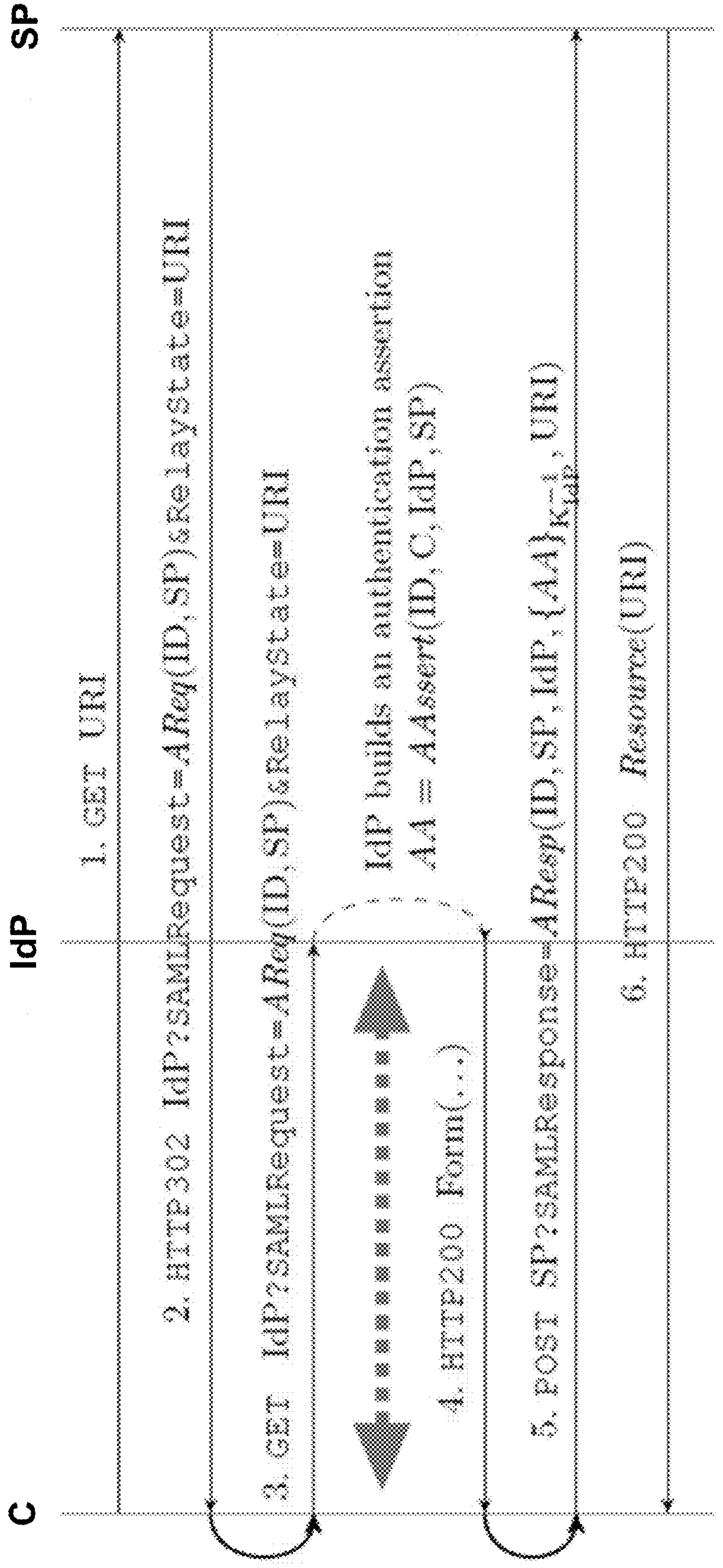
Figure 3B:
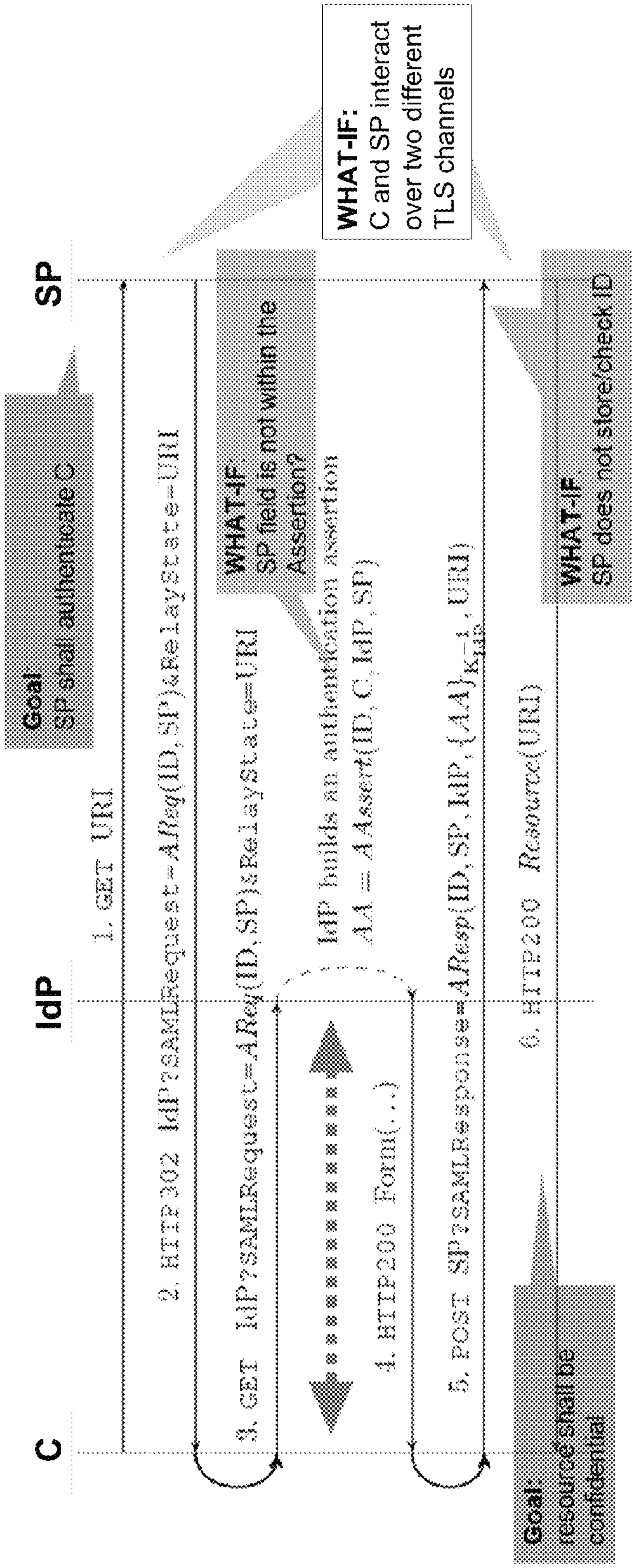

In particular, FIG. 3 shows that STIATE receives native Sequence Diagrams (SDs) and then allows annotation of the SDs with security-relevant information, as shown in FIGS. 3A-3B. As described below, such security-relevant information may include but is not limited to: goals, channel properties, and WHAT-IF conditions.

It is noted that FIG. 3A includes some annotations. For example, the text reported for each message (e.g., GET URI) contains information characterizing the security annotations. The name of the messages includes the kind of information to be provided for the message annotations. In a particular implementation (e.g., FIG. 7 below) this was done with the user interface. The AReq(ID,SP) in message 3 of FIG. 3A is a simplified version of what is in FIG. 8 described later below.

Goal information reflects particular security goals to be guaranteed. One example of a goal is confidentiality of the resource delivered to the client.

Channel property information may also be included in annotations on sequence diagrams according to embodiments. Such information may reflect those properties ensured by each communication channel ensures, e.g., unilateral Transport Layer Security (TLS).

WHAT-IF conditions may also be reflected in annotations of sequence diagrams according to embodiments. Such information may reflect conditions the development team is interested in exploring during the analysis. For example, WHAT-IF the Service Provider ID is not part of the Assertion issued by the Identity Provider?

Once created, the sequence diagrams augmented by security annotations, are then translated into formal models.

The models may then be analyzed using techniques having a rich attacker threat model built-in. Threats are thus identified.

Figure 4:
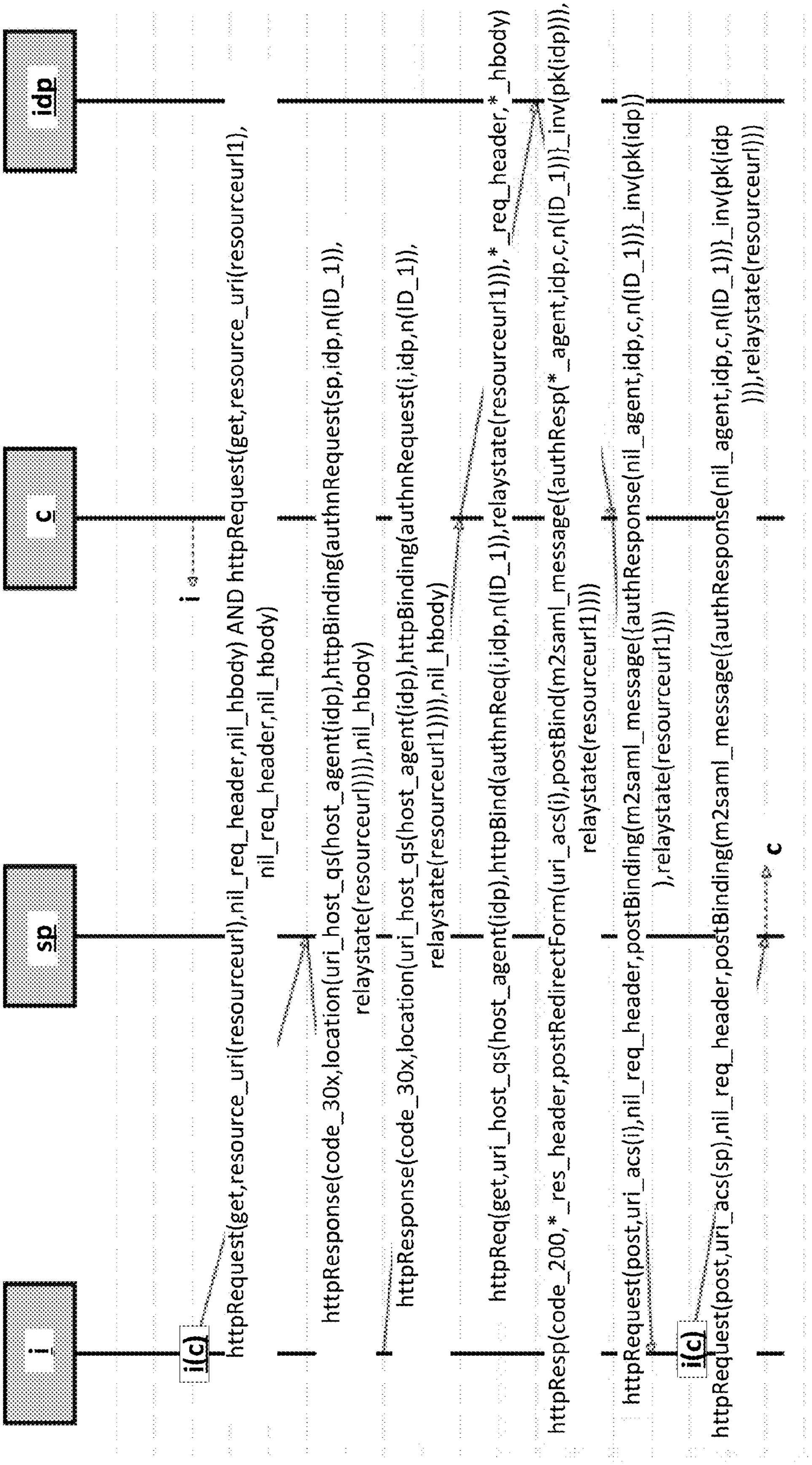
FIG. 4 shows threat rendering.

Optionally, threats may be rendered for the developer. This may be done as specific sequence diagram executions manifesting violation of one or more expressed security goals. FIG. 4 below shows an example of such threat rendering.

Test-cases are generated on top of the identified threats. These test-cases may be executed against the system under testing (SUT).

Further details regarding systems and methods implementing security threat identification and/or testing according to embodiments, are now provided in connection with the following specific example.

Example

One example of security threat identification and/or testing according to an embodiment, is now presented in connection with the sequence diagram editor of the POWER DESIGNER software available from SAP SE of Walldorf, Germany. In particular, this example offers an automated methodology leveraging sequence diagrams in the Technical Architecture Modeling (TAM) format that are available from the POWER DESIGNER software.

Specific embodiments allow enrichment of the TAM sequence diagrams with security information via a STIATE Security Annotation Editor. This example thus leverages an existing UI and a catalog of known artifacts, in order to offer a user-friendly experience to the developer, while providing the desired security annotations.

The STIATE Problem (STIATEP) is generated via the XMI export feature of the Sequence Diagram Editor. The STIATEP is an XML specification devised to render this embodiment agnostic to any particular target Sequence Diagram Editor.

Figure 5:
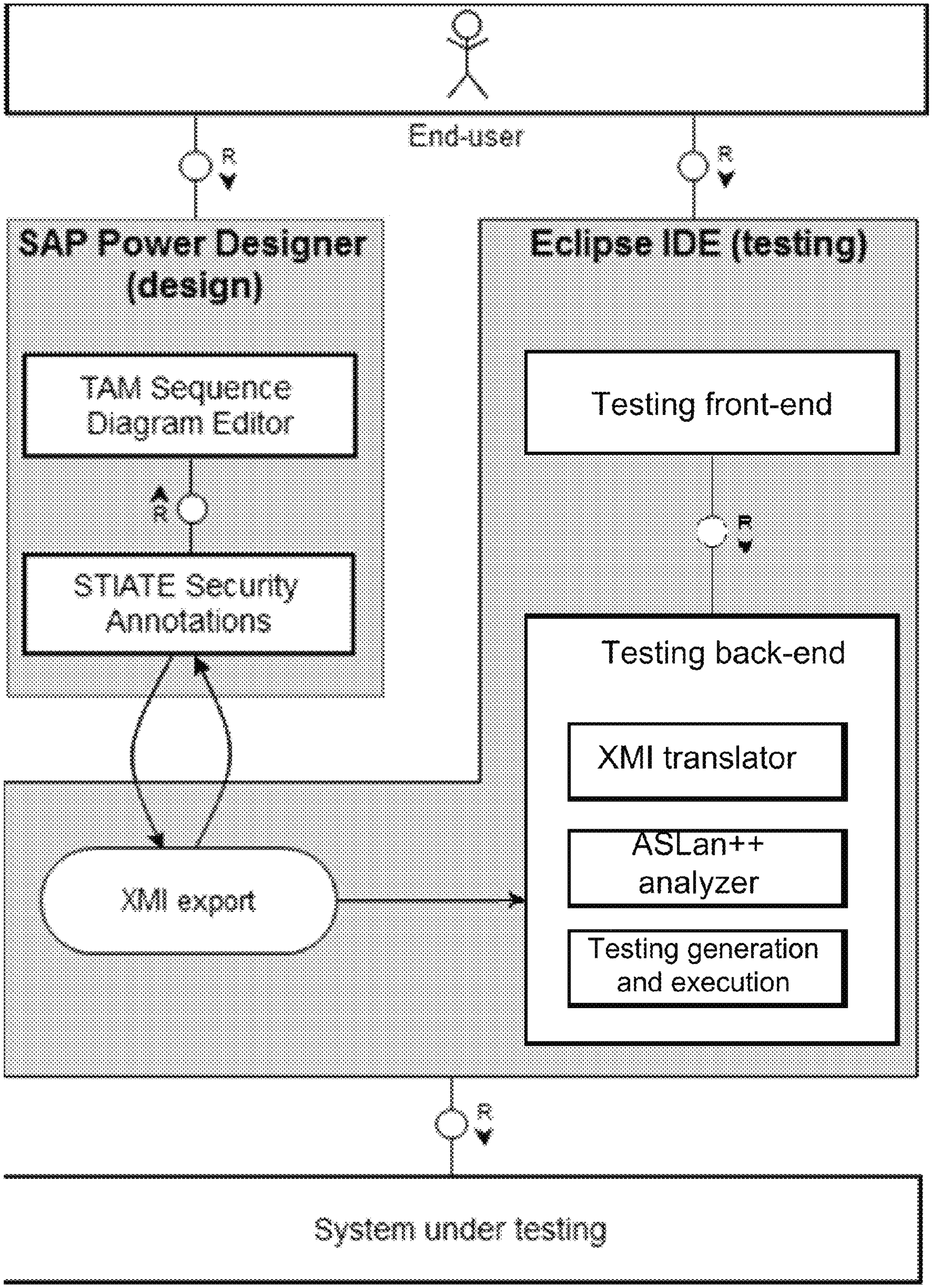
FIG. 5 shows an architecture of the particular embodiment of the example.

FIG. 5 shows an overview of the architecture of this particular embodiment. In a nutshell, it includes the common XMI representation of a SD together with its security-relevant aspects (e.g., security goals) used to perform the threat analysis.

The developer uses then the Eclipse Integrated Development Environment (IDE) to perform the following tasks. Specifically, the Eclipse IDE translates the STIATE Problem from an XMI to an ASLan++ formal specification (XMI Translator in FIG. 5);

The Eclipse IDE analyzes the ASLan++ specifications with a model checker (ASLan++ analyzer component in FIG. 5). The Eclipse IDE tests the identified threats against the real system (Test generation and execution component in FIG. 5).

More details regarding the main components are now provided. In particular, the components of STIATE include a STIATE Security Annotation Editor, an XMI Translator, an ASLan++ analyzer, and testing generation and execution.

Figure 6:
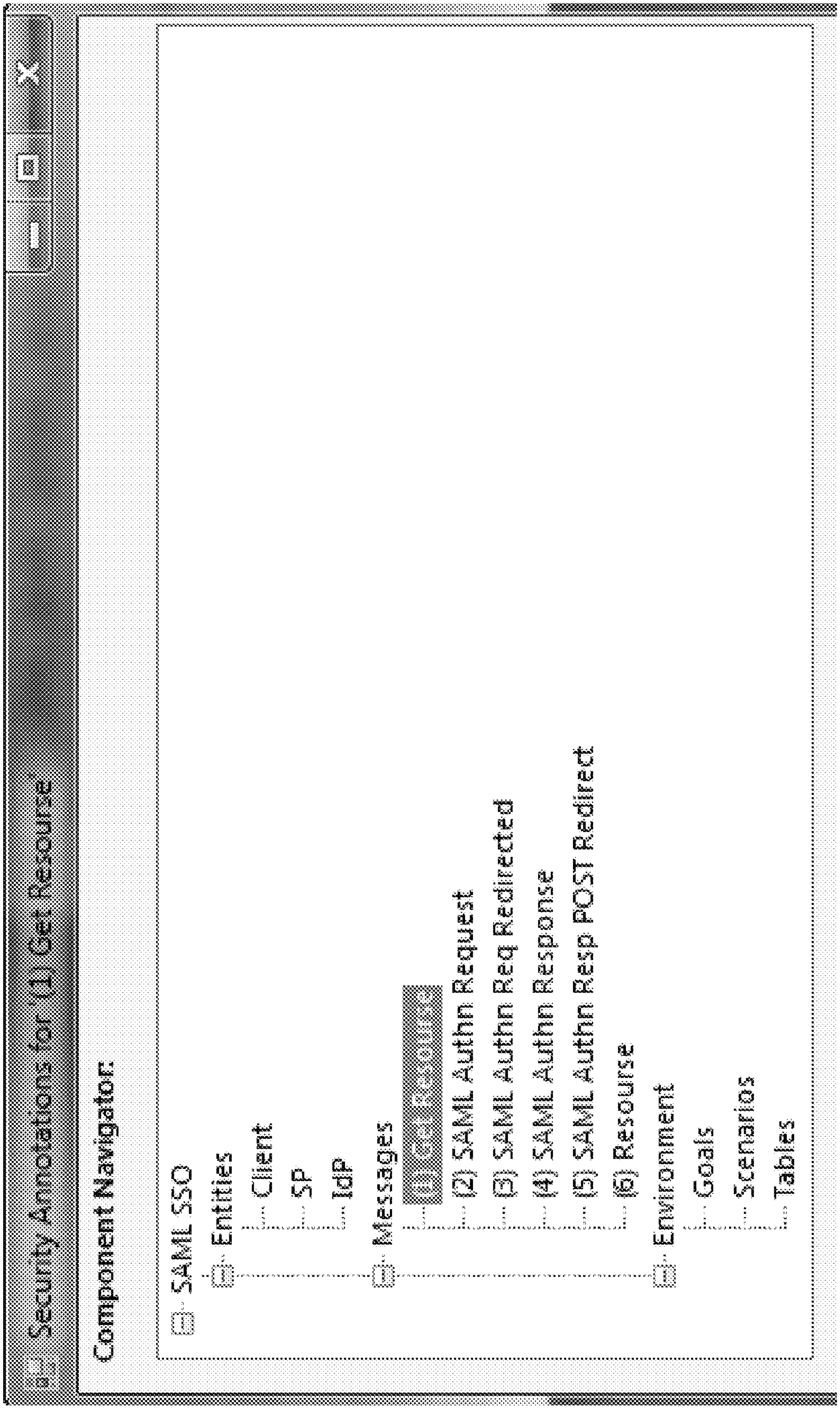
FIG. 6 shows a security annotation editor.

The STIATE Security Annotations Editor comprises a message-centric UI wizard for enriching sequence diagrams with security annotations. As an example, FIG. 6 shows the Security Annotation Editor for the sequence diagram of FIG. 2.

The Security Annotation Editor includes three sections. The Entities section is used to review the knowledge for the actors defined in the sequence diagram.

The Messages section is used to define the content for the messages exchanged between entities. The Environment section is used to define the context of the protocol including its security goals, scenarios of execution and tables available to the entities.

By using the Security Annotation Editor the developer can provide annotations for the messages and the environment in a user-friendly manner.

Annotation for the entities may be automatically derived. Annotations can include constants. These are represented as a UML object, and can comprise a fixed value for all entities throughout the environment, e.g., get, post as HTTP methods.

Annotations can include variables. These are represented as UML objects, and can comprise values that may change throughout the protocol execution. Note that for each entity a variable representing the entity itself is created.

Annotations can include functions. These functions are represented as UML classes whose attributes determines the arguments of the function. They can be used to specify the protocol's message content. Functions can reference a catalog, as shown in FIG. 26.

Annotations are typed. That is, each of the above terms have a type. Types are represented as UML interfaces.

A catalog of functions supporting the HTTP protocol and SAML is loaded at the time the Add-In starts. The catalog is represented as a class diagram and is extensible.

In particular, STIATE provides an extensible catalog of functions (represented as a class diagram) that can be used for the definition of the message content. Particular embodiments may support—among others—the HTTP and SAML-SSO protocols. FIG. 26 shows an excerpt of the catalog for function httpResponse(Code, Location, Body) that is used as root for the message in FIG. 7. The type of such function is given by the parent class, i.e., message, while its attributes define the types of the function arguments, i.e., Code of type code, Location of type res_header, and Body of type hbody.

Annotations for each of the categories (i.e., messages, entities, and the environment), are now described.

Regarding message security annotations, these provide the message content. The message is represented as a tree where each node can contains constants, variables or functions. Each leaf contains a variable or a constant.

Figure 7:
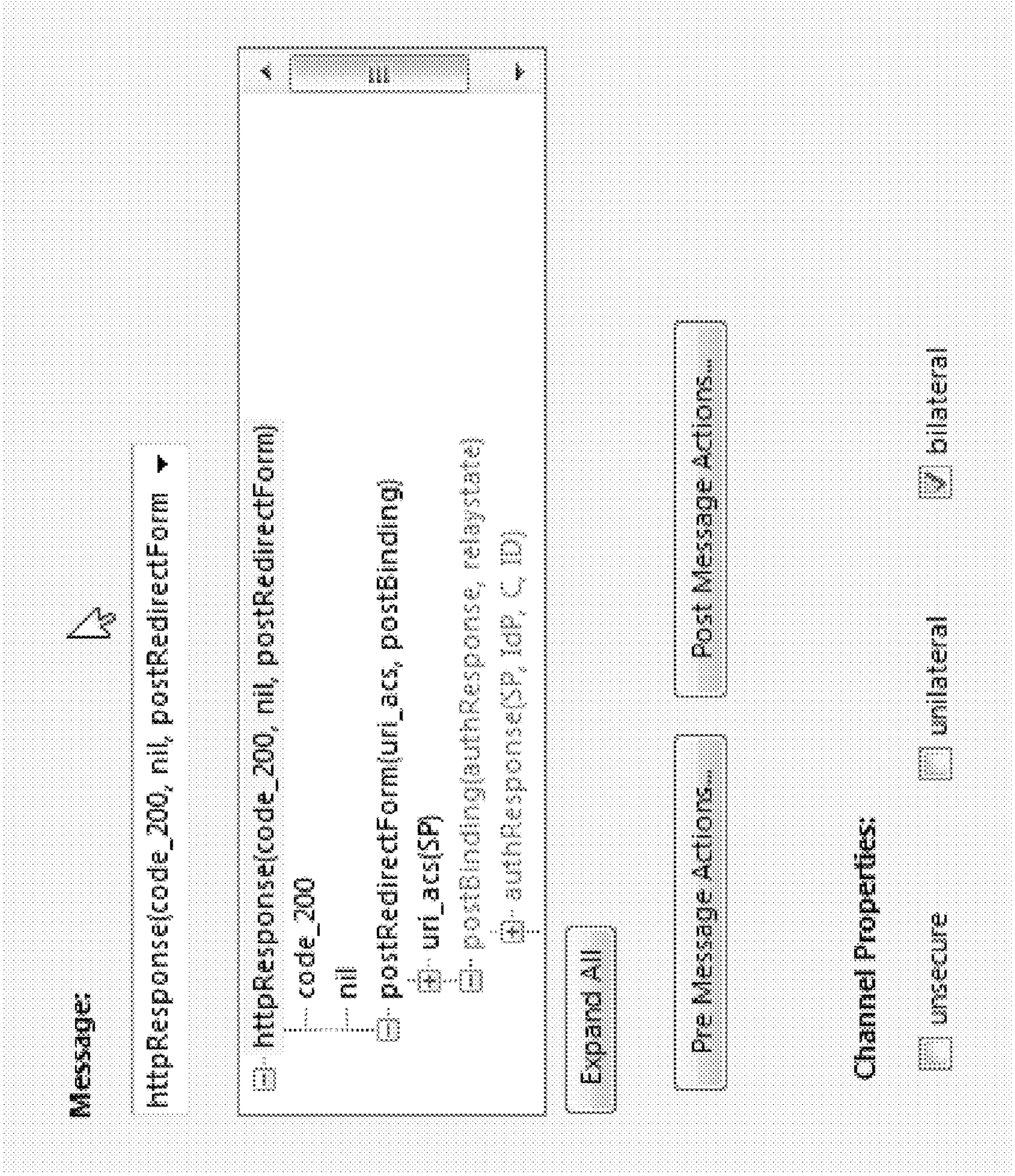
FIG. 7 shows security annotation for an HTTP response message.

FIG. 7 shows security annotation for messages. In particular, FIG. 7 shows the Security Annotation Editor for message (4) SAML Authn Response of FIG. 2. The message is displayed in a tree view.

In the example, the message represents an HTTP Response with code 200, empty location (represented with the keyword nil), and an HTTP body containing a POST redirect form composed of an authentication response.

Figure 8:
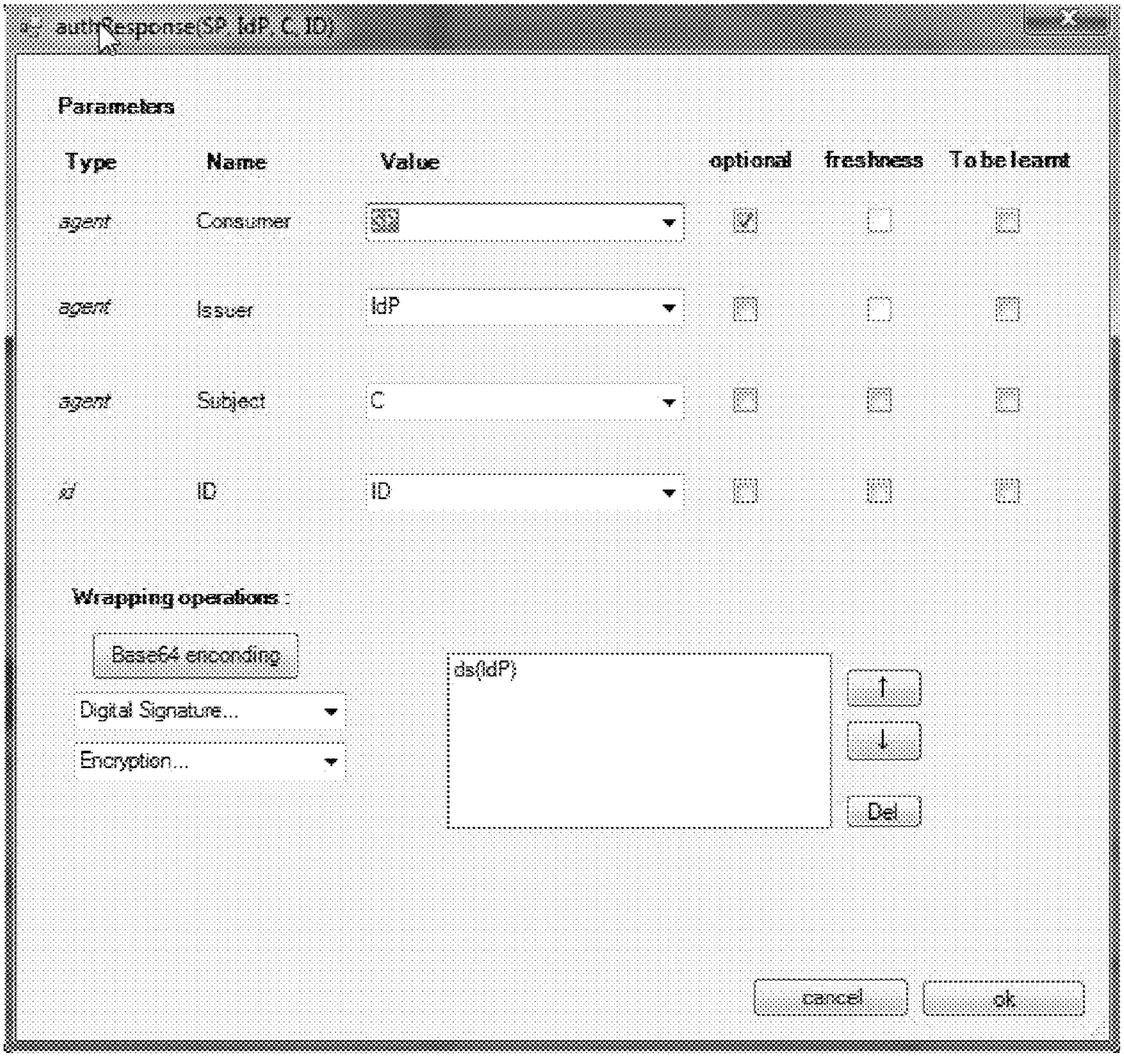
FIG. 8 shows a security annotation editor for authResponse.

The Security Annotation Editor allows specifying the message utilizing dedicated UIs. As an example, the authentication response:

authResponse(SP,IdP,C,ID)

can be specified with the UI of FIG. 8. Such a UI allows selecting the desired value for each of the fields of the authentication response.

The structure of the authResponse function is known, because it is defined within the catalog. As a result the type of each of the argument is also provided. The developer is thus guided in the definition, as only values of the required type can be selected in the drop-down box.

A set of options are available for each field. In particular, the optional option allows expressing the WHAT-IF condition. The freshness option states that this field of the message has to be freshly generated before sending it. The to be learnt option states that such field has to be learnt by the receiver of the message.

In FIG. 8 the Consumer of the assertion (i.e., SP) is marked as Optional to express a WHAT-IF condition. As a result, the analysis will consider either the case when such field is contained in the message or it is not.

Finally, the function definition window allows to sign and/or encrypt the function being specified. This is shown in the bottom of FIG. 8.

To complete the message definition, the modeler defines the properties of the channel over which the message is sent, and pre/post message actions (if any).

Channel properties can be defined in the bottom part of the main window, as shown in FIG. 7. Such properties can include Insecure, that is, the communication medium is a channel without any protection (an insecure channel). This indicates that a malicious agent can read and intercept the messages, as well as send arbitrary messages crafted to any agent, as long as he has the appropriate keys (i.e., he does not break cryptography).

Another channel property is Unilateral, i.e., unilateral confidential and authentic. This can be used to model a run of SSL/TLS in which one entity has a valid certificate (e.g. the server), while the other entity has not (e.g. the browser).

Another channel property is Bilateral, i.e., bilateral confidential and authentic. This indicates, for instance, modeling a run of SSL/TLS in which the two entities have a valid certificate with each other.

Though the channel properties are defined within a message definition window, they are a property of the channel itself. Thus they are the same for all messages exchanged between the same pair of entities.

Pre and Post actions can be defined by pressing the Pre Message Actions . . . or Post Message Actions . . . buttons in the main window of FIG. 7. Pre actions are executed by the sender entity before sending the message, whereas post actions are executed by the receiver entity upon reception.

Examples of Pre-actions can include:

Extract: to extract a variable from a table;

Add: to add a variable to a table;

Remove: to remove a variable from a table;

Assert: to state that a fact, i.e., a 0-ary function in our context, has to be valid.

Examples of Post-actions can include:

Check: to check if a variable is part of a table;

Extract: as for pre-actions;

Add: as for pre-actions;

Remove: as for pre-actions;

Assert: as for pre-actions;

Disequal: to state that two variables have to be different.

The annotations are encoded in XML. As an example, the annotations for the message in FIG. 7 are encoded as shown in FIG. 9.

Figure 10:
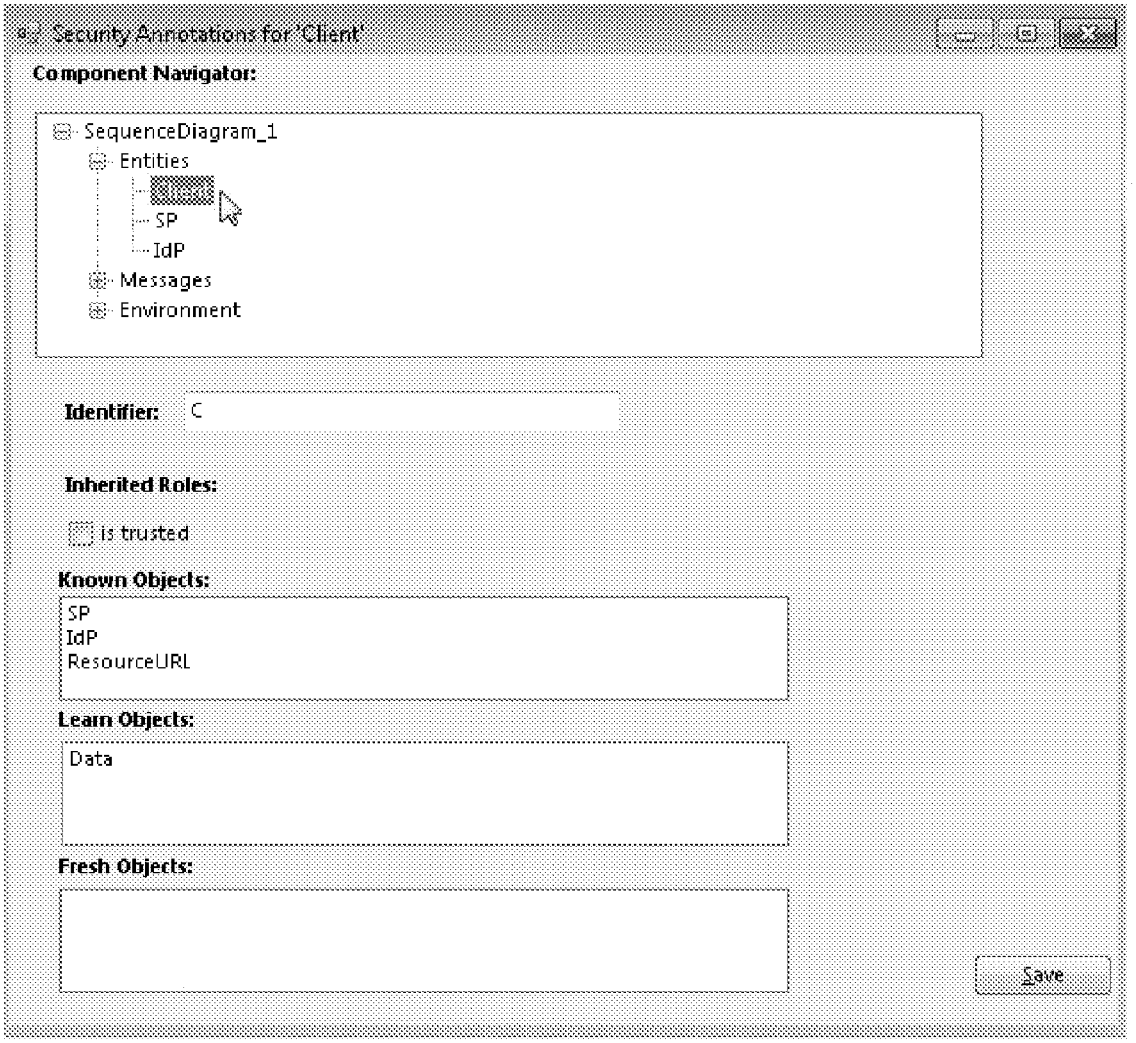
FIG. 10 shows security annotation for entities.

Entity security annotations are now described. FIG. 10 shows the Security Annotation Editor for the Client entity. Note that entity annotations are not explicitly provided by the developer, but instead are derived from the messages' security annotations. Accordingly, the view in FIG. 10 provides information rather than defining content.

Entity annotations determine the knowledge of the entity, e.g., what is known by the entity since the beginning of the protocol execution and what is learnt at a certain protocol step. For example, in detail each variable part of the entity knowledge can be known, fresh, or learnt.

A variable is known if it is part of the initial knowledge of an entity. A variable is fresh if it is created by the entity during the protocol execution. A variable is learnt if it is received and learnt by an entity as result of a received message.

The fact that a variable is known, learnt, or fresh, is derived from the way it is used in the messages. Additionally, it is enforced that a variable can only be either fresh or learnt. Next to the type, annotations include the information about the position after which the object become part of the knowledge (where 0 is used to indicate that it is part of the initial knowledge).

Finally, the identifier field in FIG. 10 allows definition of the name to be used for the variable representing the entity within the protocol. The "is trusted" checkbox allows specifying that no dishonest agent can play the entity being defined. This is a value that the developer may (optionally) set.

The annotations are encoded in XML. As an example, the annotations in FIG. 10 are XML encoded as shown in FIG. 11.

Environment Security Annotations are now described. In particular, the environment allows defining security goals, scenarios, and tables.

Figure 12:
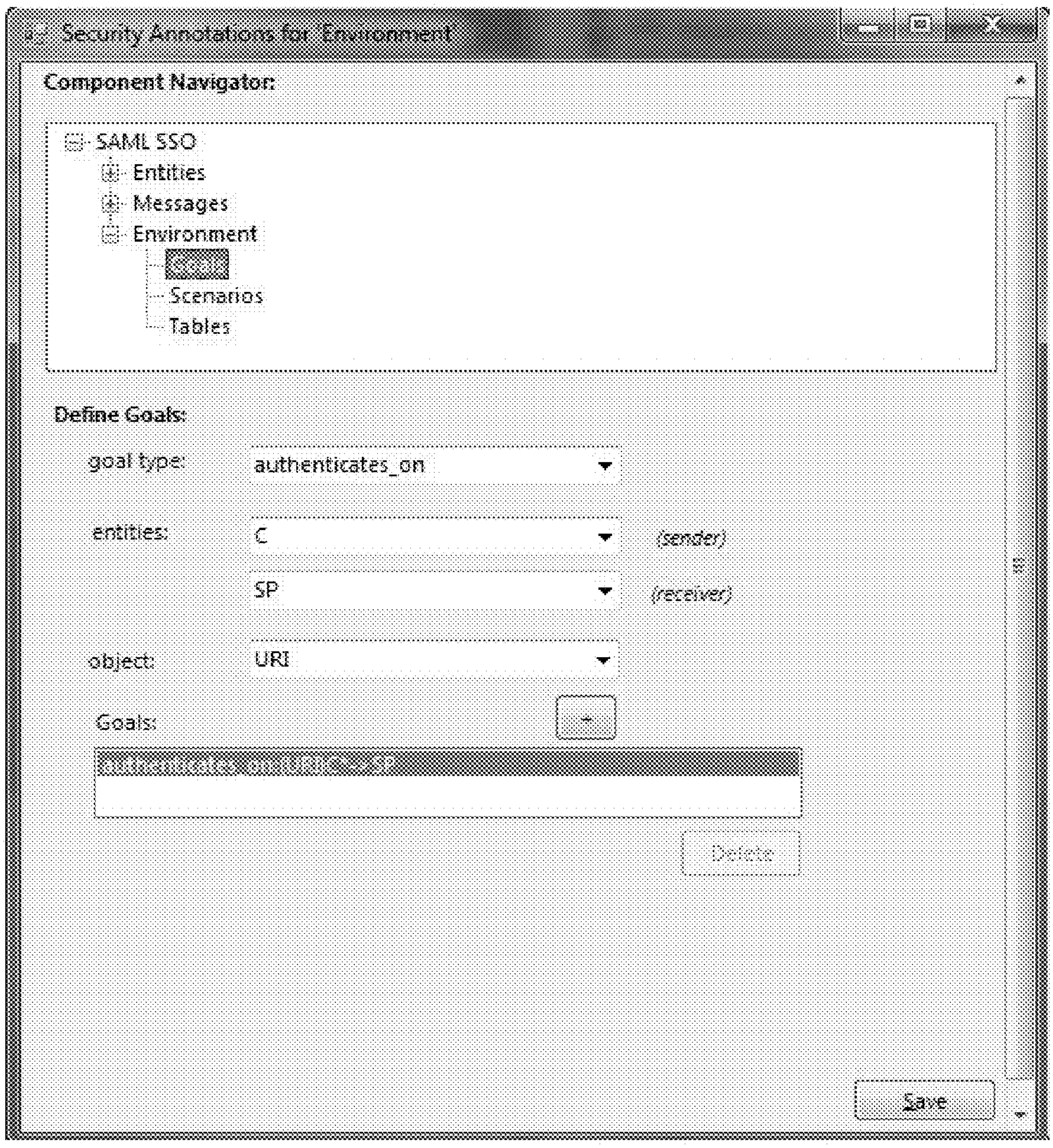
FIG. 12 shows goal definition by a security annotation editor.

FIG. 12 shows the goal section of the Security annotation Editor, in which a goal may be defined. The goal type drop down list allows choosing the type of goal. Examples of security goals are authentication and secrecy. The figure shows an authentication goal.

In this case, the modeler specifies the actor to be authenticated (e.g., C in the figure), the one performing the authentication (SP in the figure), and the object on which the authentication is performed. In the case of secrecy goals, the modeler specifies the data and the actors among which the secrecy of the data is to be ensured.

Figure 13:
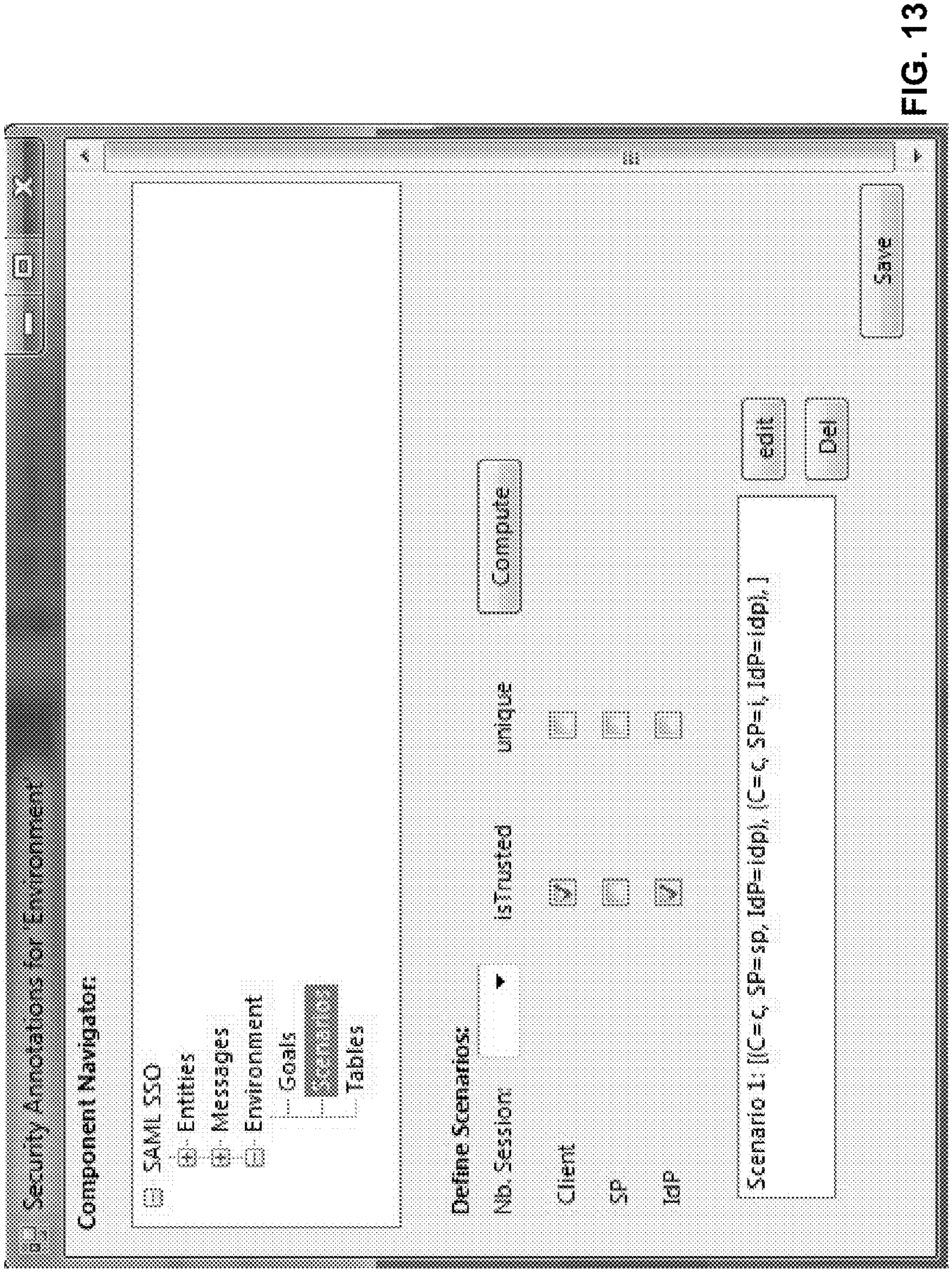
FIG. 13 shows scenario definition by a security annotation editor.

FIG. 13 shows the scenario definition window of the Security annotation Editor. The scenario allows specifying the execution context of the protocol in terms of number of sessions (two by default) and entity properties. In particular, "is trusted" denotes that the actor cannot be played by the intruder, whereas "unique" is used to indicate that all sessions are played by the same agent.

Figure 14:
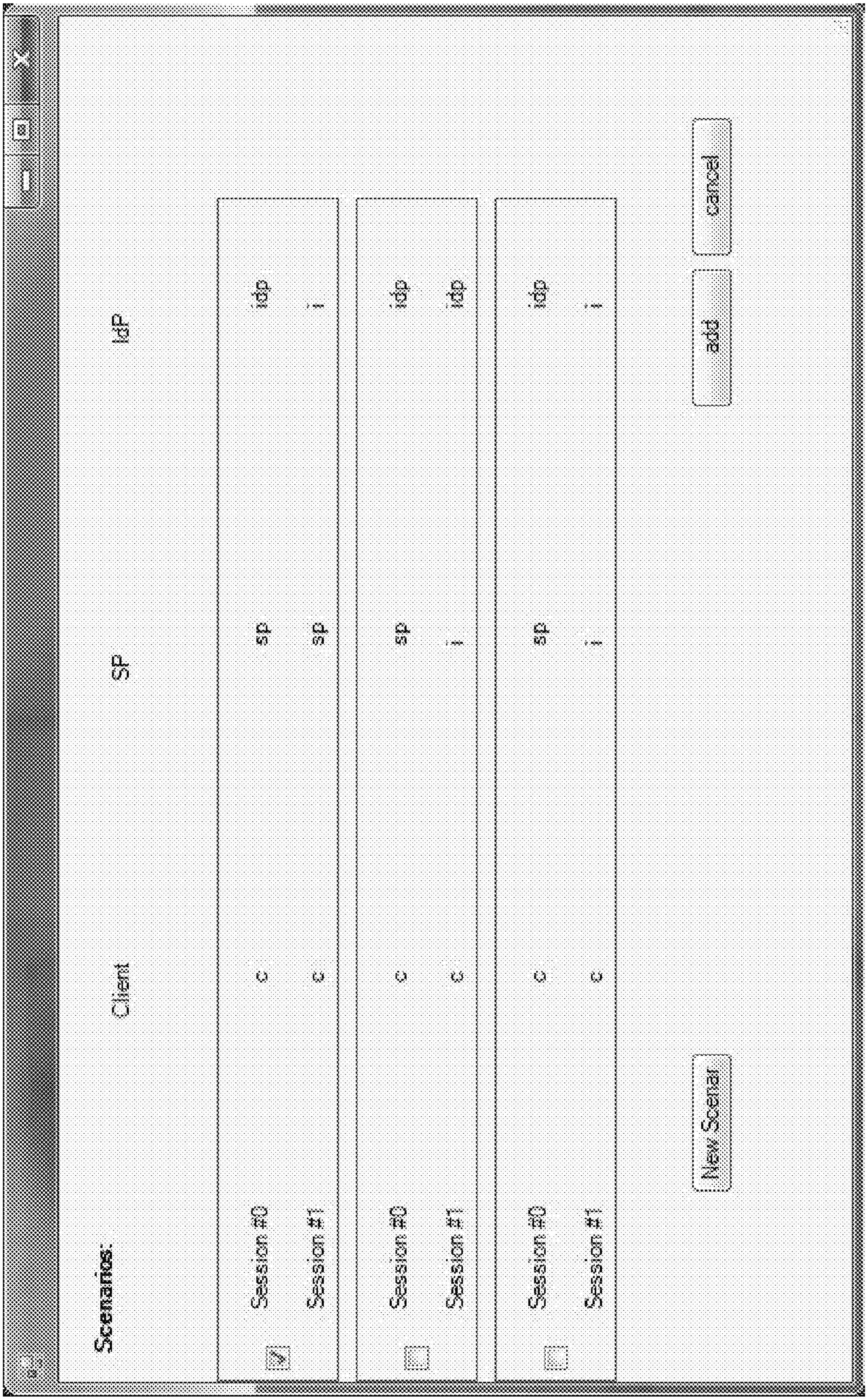
FIGS. 14-15 show session definition by a security annotation editor.

By pressing Compute, the Security Annotation Editor computes all possible sessions instances given the selected properties. This is shown in FIG. 14.

The modeler can then select the desired scenarios, or edit a new one manually (e.g., using the New Scenario button).

Once the sessions are defined, the initial value for all the known variables of each entity have to be provided (excluding variables representing actors). This can be done by selecting the scenario at the bottom of the window in FIG. 13 and pressing edit.

Figure 15:
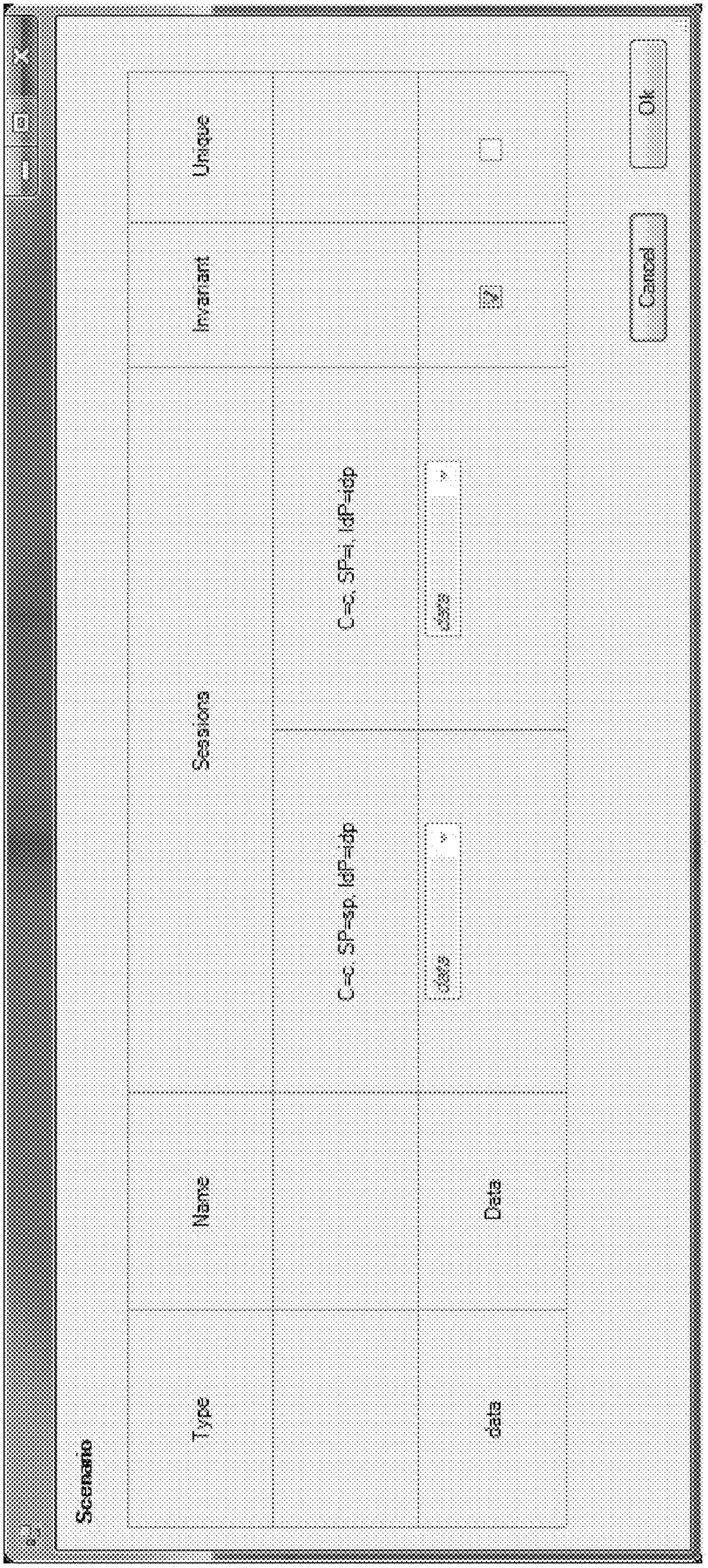

The window in FIG. 15 is then displayed to provide the initial values for each session. The invariant and unique can be used by the modeler in this step.

For example, by selecting Invariant a different constant is created for each session. By selecting Unique a single constant is created and used for all sessions.

Finally, the Security Annotation Editor allows the definition of tables. The developer can create, edit, or delete tables. New table structures may be defined in terms of required columns.

An owner for the table can also be defined. As a result the table will only be known by the owning entity. If no owner is given, the table will be shared among all entities.

The annotations for the environment are encoded in XML according to FIG. 16. Security annotations stored as XML can be exported as XMI (XML Metadata Interchange) to be translated, as is now described.

Specifically, the XMI file exported from the SAP PowerDesigner software, is translated into a formal, ASLan++ model using a Java plugin integrated in the Eclipse JRE environment including the ASLan++ analyzer.

The XMI specification is an XML file containing the standard representation of the sequence diagram SD, together with its security-relevant aspects specified as shown in FIGS. 9, 11, and 16.

The translation may have at least three main steps. A first step is parsing the XMI file and creation of its Java representation.

A second step is evaluation of WHAT-IF conditions, channels' properties, and scenarios to determine how many ASLan++ model to generate. A third steps generation of the ASLan++ model.

Figure 17:
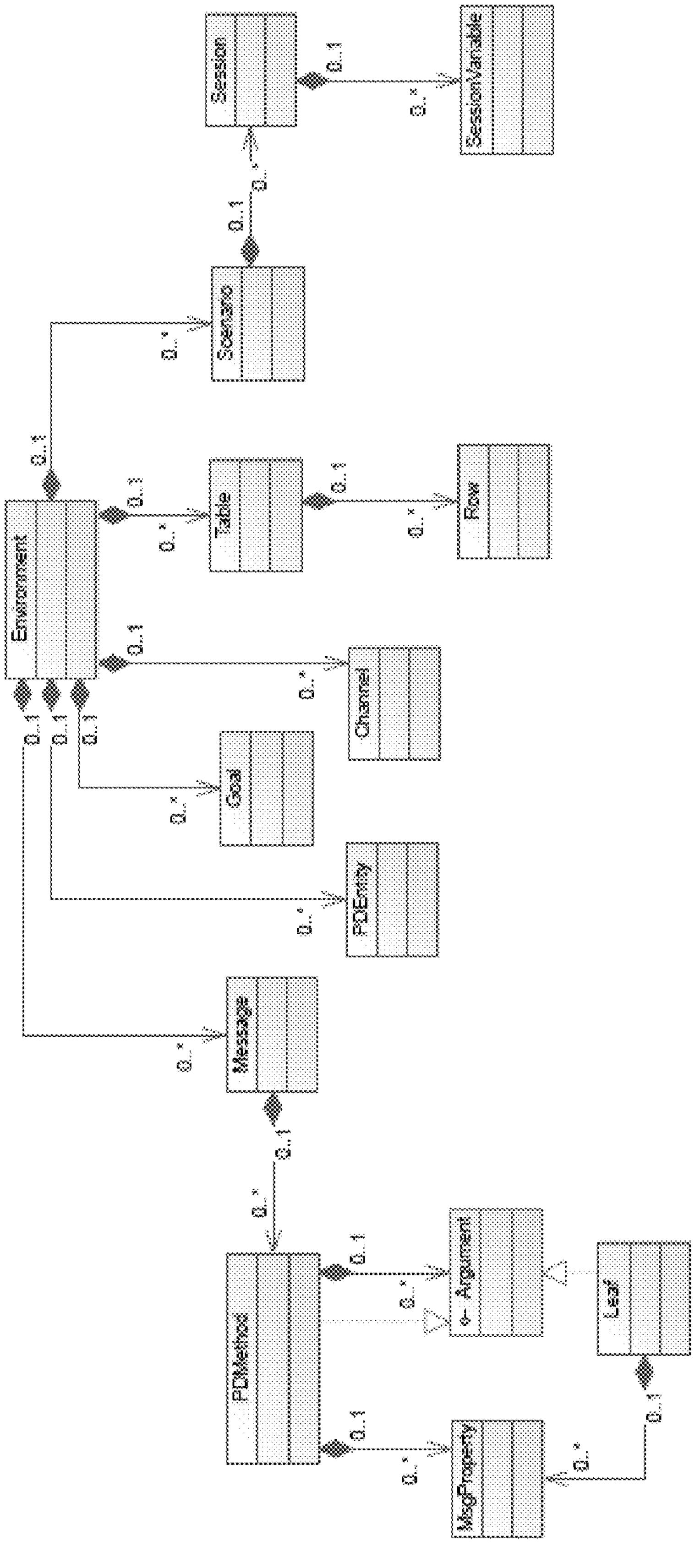
FIG. 17 shows a PDxmi package architecture.

An overview of the Java package representing the XMI (i.e., PDxmi) is provided in FIG. 17. The main class is the environment including protocol elements and the scenarios.

The PDEntity class is used to represent the actors of protocol and Message is used for the messages exchanges. In particular messages contain the PDMethod that are used to represent the functions that a message may include.

MsgProperty, Leaf, Argument and Channel are used to represent what can be specified. The Goal, Table, and Scenario are instantiated according to what was specified as described.

FIG. 17 shows the PDxmi package architecture. While the XMI model created with the Security Annotation Editor allows specifying alternatives (e.g., the WHAT-IF conditions), a separate ASLan++ model is created for each alternative.

XMI elements representing alternatives are:

- optional arguments in a message (WHAT-IF condition);
- channels' properties (a message specified in the frontend to be both unsecure or unilateral);
- multiple scenarios (each one of them including a set of sessions).

Such alternatives are combined in order to compute the number of ASLan++ models to be created. These models may be created following the algorithm in FIG. 18 generating multiple ASLan++ files.

This embodiment generates ASLan++ models relying on the ASLan++ Java library developed in the EU project AVANTSSAR. In that project, the library was used to translate ASLan++ models into ASLan ones. By contrast, in the instant example the library is used to transfer the semantics of the protocol represented via the PDxmi package in the ASLan++ syntax.

Translating options of the argument is an important step. In particular, optionality of a value of a message does not only impact the message itself, but is propagated. This is due to the fact that the optional value is not received by the receiving entity, and thus it cannot be used later on if not received via another message or already known.

Turning now to the ASLan++ analyser, that component is a set of Eclipse plugins developed in the context of the AVANTSSAR and SPACIOS projects. More precisely, the set of plugins indicated via the ASLan++ analyser may include:

the ASLan++ editor, an editor for ASLan++ formal specifications;

the ASLan++ connector, a translator from ASLan++ formal specifications into ASLan formal specifications;

SATMC, model checker that has a tunable, built-in Dolev Yao attacker to execute security analysis of ASLan formal specifications.

A simple chain underlies the ASLan++ analyser. ASLan++ specifications are translated into ASLan specifications that are in turn analysed by the SATMC model checker. In this example, it suffices to look at the input/output aspects of this chain.

The ASLan++ language utilized in this example is now discussed. ASLan++ is a formal language for specifying security-sensitive service-oriented architectures, their associated security policies, and their trust and security properties.

The semantics of ASLan++ is formally defined by translation to ASLan, the low-level specification language that is the input language for the back-ends of the AVANTSSAR Platform.

Figure 19:
FIGS. 19-19B show an ASLan++ example.

FIG. 19 is a snap-shot of the ASLan++ Editor. This presents a fragment of the ASLan++ formal specification to automatically be obtained from the sequence diagram (SD) of FIG. 2 with security annotations.

Figure 19A:
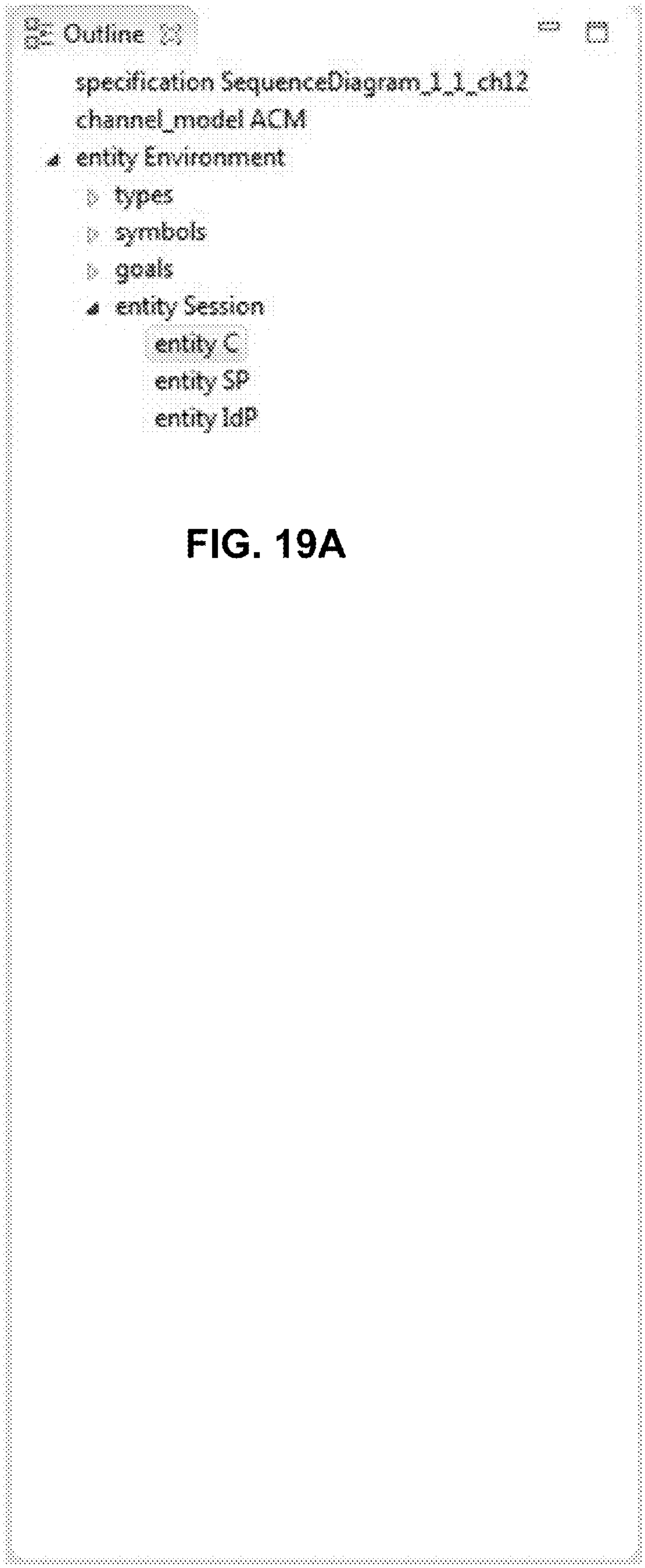

The right-hand-side window of FIG. 19 is an outline portion. The detailed view of FIG. 19A indicates this SD to have three basic entities: Client, SP, and IdP. These three basic entities build into a "Session entity" in ASLan++.

The Environment entity captures the execution of multiple sessions, each session instantiated with real actors playing the basic entities. There is an authentication goal concerning SP and C.

The left-hand-side window of FIG. 19 is shown enlarged in FIG. 19B. It depicts a fragment of the Client entity. The entity has a set of parameters (e.g., SP and IdP) with which the actor playing this entity will interact.

The entity further has a set of symbols (i.e., local variables), and a body in which the message exchanges are described. Message exchange can be coupled together with control flow operations such as pre- and postactions.

The first two messages (cf. FIG. 19B) capture the Actor playing this Client entity, sending an HTTP request to access ResourceURL at SP. The Actor then receives from SP an HTTP redirect response that comprises the SAML authentication request (authnRequest(:::)).

The ASLan++ level requires more details than those available in the SD. Security annotations according to embodiments, together with the UI wizards, bridge this gap and provide an enhanced degree of usability.

Turning now to examine security threats, such threats are reported by the model checker in a raw text format that can be properly rendered via the threat visualizer. FIG. 4 presents the graphical representation of the threat reported by running the ASLan++ analyser on the ASLan++ specification of FIG. 19. The threat affects the authentication goal.

The testing generation and execution component of this example is now discussed. The testing generation and execution is a set of Eclipse plugins that have been developed in the context of SPACIOS project.

The plugins follow the Instrumentation-based Testing (IBT) approach that—given an abstract trace together with test data—allows for testing web-based security protocols. Basically, the IBT plugins make concrete, and execute abstract traces against a System Under Testing (SUT, i.e., fragment of the overall system that is intended to be tested). IBT supports (i) the binding of specifications of security protocols to actual implementations through model instrumentation, and (ii) the automatic testing of real implementations against abstract traces (normally capturing putative attacks) found by SATMC.

The concretization phase amounts to (i) instrumenting the ASLan model as Java methods, (ii) selecting those Java methods that represent actions to be executed by simulated agent, and (iii) sequencing this subset according to the ordering described by the abstract trace.

The output of this concretization phase is a Java program implementing the concrete test case. Executing this Java program within a Java Runtime Environment results in executing the abstract test case against the SUT. This normally requires the usage of a testing adapter.

Embodiments permit binding of a catalog of functions (HTTP, SAML, . . . ) used to annotate the messages in the SD, with our re-usable testing adapter (set of Java classes providing implementing construction and de-construction of those function in the real world). This reduces the input required to the end user in order to execute the tests.

For instance, all security-annotated SD that includes the catalog 4-ary function: httpRequest(method, uri, headers, body), can re-use the Java methods of the general testing adapter to construct (cf. FIG. 20) and de-construct HTTP requests (cf. FIG. 21).

FIG. 20 shows a testing adapter with Java constructor for HTTP Request. FIG. 21 shows a testing adapter with Java de-constructors for HTTP Request.

Figure 24:
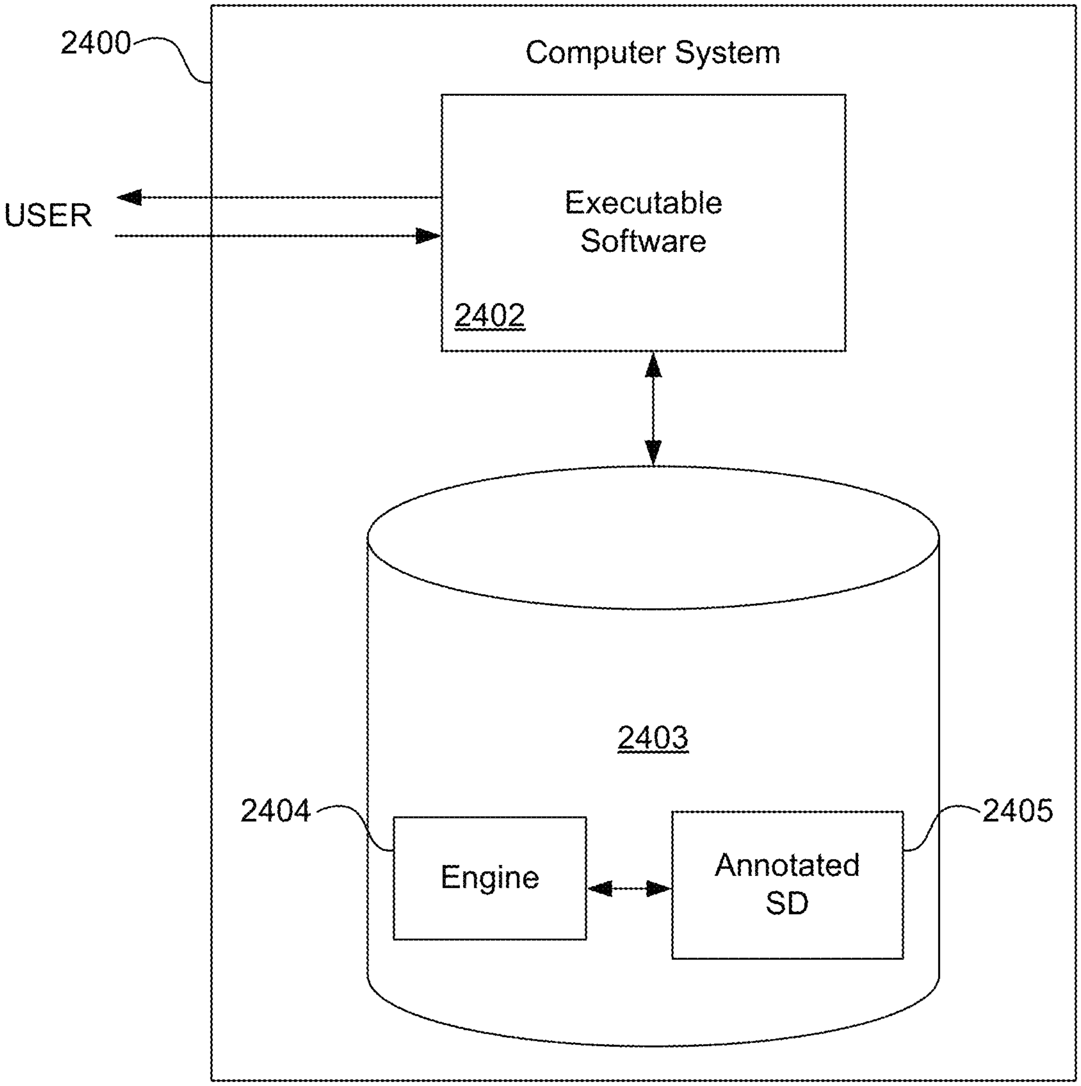
FIG. 24 illustrates hardware of a special purpose computing machine configured to perform security threat identification according to an embodiment.

FIG. 24 illustrates hardware of a special purpose computing machine configured to perform security threat identification and testing according to an embodiment. In particular, computer system 2401 comprises a processor 2402 that is in electronic communication with a non-transitory computer-readable storage medium 2403. This computer-readable storage medium has stored thereon code 2405 corresponding to an annotated sequence diagram. Code 2404 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 24, the engine is shown as being part of the database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 25:
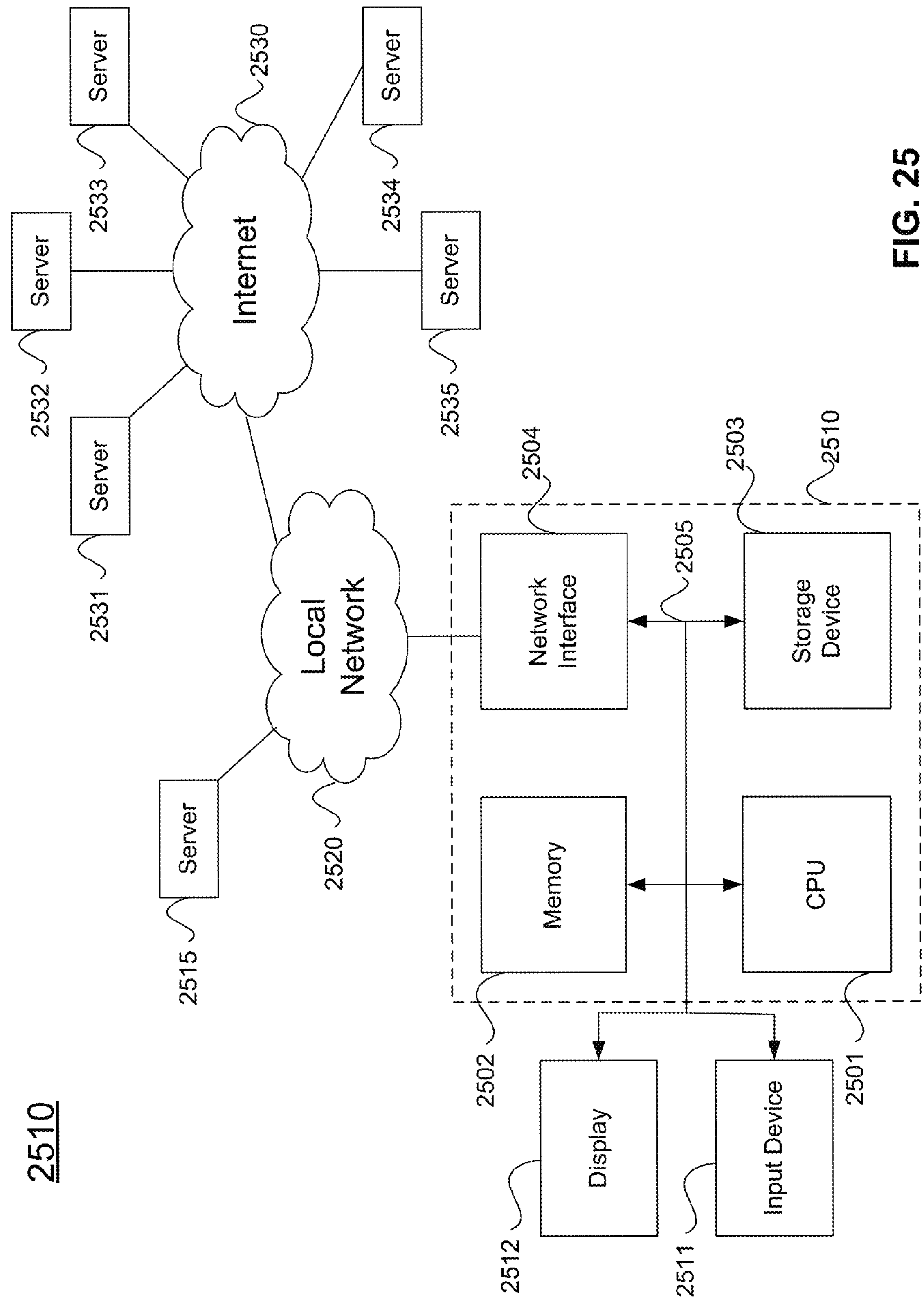
FIG. 25 illustrates an example of a computer system.

An example computer system 2500 is illustrated in FIG. 25. Computer system 2510 includes a bus 2505 or other communication mechanism for communicating information, and a processor 2501 coupled with bus 2505 for processing information. Computer system 2510 also includes a memory 2502 coupled to bus 2505 for storing information and instructions to be executed by processor 2501, including information and instructions for performing the techniques described above, for example. This memory may also be used for storing variables or other intermediate information during execution of instructions to be executed by processor 2501. Possible implementations of this memory may be, but are not limited to, random access memory (RAM), read only memory (ROM), or both. A storage device 2503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2503 may include source code, binary code, or software files for performing the techniques above, for example. Storage device and memory are both examples of computer readable mediums.

Computer system 2510 may be coupled via bus 2505 to a display 2512, such as a cathode ray tube (CRT) or liquid crystal display (LCD), for displaying information to a computer user. An input device 2511 such as a keyboard and/or mouse is coupled to bus 2505 for communicating information and command selections from the user to processor 2501. The combination of these components allows the user to communicate with the system. In some systems, bus 2505 may be divided into multiple specialized buses.

Computer system 2510 also includes a network interface 2504 coupled with bus 2505. Network interface 2504 may provide two-way data communication between computer system 2510 and the local network 2520. The network interface 2504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2504 sends and receives electrical, electromagnetic, or optical signals that carry digital data streams representing various types of information.

Computer system 2510 can send and receive information, including messages or other interface actions, through the network interface 2504 across a local network 2520, an Intranet, or the Internet 2530. For a local network, computer system 2510 may communicate with a plurality of other computer machines, such as server 2515. Accordingly, computer system 2510 and server computer systems represented by server 2515 may form a cloud computing network, which may be programmed with processes described herein. In the Internet example, software components or services may reside on multiple different computer systems 2510 or servers 2531-2535 across the network. The processes described above may be implemented on one or more servers, for example. A server 2531 may transmit actions or messages from one component, through Internet 2530, local network 2520, and network interface 2504 to a component on computer system 2510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

an engine receiving a sequence diagram of a system comprising a plurality of entities, and messages between the plurality of entities sent along communications channels;

the engine generating from the sequence diagram, an annotated sequence diagram including an annotation of security information comprising a security goal reflecting an environment in which the plurality of entities reside;

the engine displaying the annotated sequence diagram;

the engine translating the annotated sequence diagram into a model based upon the annotation;

the engine identifying a threat based upon the model; and the engine executing on a hardware processor, a computer program stored in a memory to display a rendering of the threat, the rendering comprising a specific sequence diagram execution manifesting violation of the security goal.

2. A method as in claim 1 wherein the annotation comprises a function.

3. A method as in claim 2 wherein the function references a catalog.

4. A method as in claim 1 further comprising the engine testing the threat.

5. A non-transitory computer readable storage medium embodying a computer program for performing a method, said method comprising:

an engine receiving a sequence diagram of a system comprising a plurality of entities, and messages between the plurality of entities sent along communications channels;

the engine generating from the sequence diagram, an annotated sequence diagram including an annotation of security information comprising a security goal reflecting an environment in which the plurality of entities reside;

the engine displaying the annotated sequence diagram;

the engine translating the annotated sequence diagram into a model based upon the annotation;

the engine identifying a threat based upon the model; and the engine executing the computer program on a hardware processor to display a rendering of the threat, the rendering comprising a specific sequence diagram execution manifesting violation of the security goal.

6. A non-transitory computer readable storage medium as in claim 5 wherein the annotation comprises a function.

7. A non-transitory computer readable storage medium as in claim 6 wherein the function references a catalog.

8. A non-transitory computer readable storage medium as in claim 5 wherein the method further comprises the engine testing the threat.

9. A computer system comprising:

one or more processors;

a software program stored in memory and executable on said computer system, the software program configured to cause an engine to:

receive a sequence diagram of a system comprising a plurality of entities, and messages between the plurality of entities sent along communications channels;

generate from the sequence diagram, an annotated sequence diagram including an annotation of security information reflecting an environment in which the plurality of entities reside, the annotation comprising a security goal;

display the annotated sequence diagram;

translate the annotated sequence diagram into a model based upon the annotation;

identify a threat based upon the model; and display a rendering of the threat, the rendering comprising a specific sequence diagram execution manifesting violation of the security goal.

10. A computer system as in claim 9 wherein the software program is further configured to cause the engine to test the threat.

* * * * *